US012744830B2

(12) United States Patent
Lintz et al.

(10) Patent No.: US 12,744,830 B2
(45) Date of Patent: Sep. 22, 2026

(54) SYSTEMS, METHODS, AND APPARATUSES FOR STORAGE MANAGEMENT

(71) Applicant: Comcast Cable Communications, LLC, Philadelphia, PA (US)

(72) Inventors: Christopher Lintz, Denver, CO (US); Justin Luna, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 147 days.

(21) Appl. No.: 18/910,910

(22) Filed: Oct. 9, 2024

(65) Prior Publication Data

US 2025/0112969 A1 Apr. 3, 2025

Related U.S. Application Data

(63) Continuation of application No. 18/309,426, filed on Apr. 28, 2023, now Pat. No. 12,155,723, which is a continuation of application No. 17/181,625, filed on Feb. 22, 2021, now Pat. No. 11,683,373.

(60) Provisional application No. 62/978,974, filed on Feb. 20, 2020.

(51) Int. Cl.

| | |
|---|---|
| ***H04L 67/1097*** | (2022.01) |
| ***G06F 9/50*** | (2006.01) |
| ***H04L 67/52*** | (2022.01) |
| ***H04L 67/561*** | (2022.01) |
| ***H04L 67/568*** | (2022.01) |

(52) U.S. Cl.
CPC ........ *H04L 67/1097* (2013.01); *G06F 9/5011* (2013.01); *H04L 67/52* (2022.05); *H04L 67/561* (2022.05); *H04L 67/568* (2022.05)

(58) Field of Classification Search
CPC ... H04L 67/1097; H04L 67/52; H04L 67/568; H04L 67/561; G06F 9/5011
See application file for complete search history.

(56) References Cited

U.S. PATENT DOCUMENTS

| | | | | |
|---|---|---|---|---|
| 6,112,207 | A * | 8/2000 | Nori | G06F 16/284 |
| 6,799,253 | B1 * | 9/2004 | Peterson | G06F 12/023 711/132 |
| 8,041,907 | B1 * | 10/2011 | Wu | G06F 11/1453 707/648 |
| 8,521,986 | B2 * | 8/2013 | Beckmann | G06F 3/0644 711/170 |
| 8,571,387 | B2 * | 10/2013 | Boston | H04N 5/76 386/292 |
| 8,595,237 | B1 * | 11/2013 | Chaudhary | G06F 16/14 707/741 |
| 9,195,666 | B2 * | 11/2015 | Horn | G06F 16/178 |
| 9,886,449 | B1 * | 2/2018 | Van Riel | G06F 3/0656 |
| 10,326,798 | B2 * | 6/2019 | Lambert | H04L 63/18 |

(Continued)

*Primary Examiner* — Jonathan A Bui
(74) *Attorney, Agent, or Firm* — Ballard Spahr LLP

(57) ABSTRACT

A computing device may receive a request to store a content segment(s). The request may include an estimated storage size. The computing device may determine a plurality of storage devices based on an estimated capacity of each of the storage devices to store the content segment(s). The computing device may cause each of the storage devices to allocate storage for the content segment(s). The allocated storage may be tracked and/or retrieved based on location metadata indicative of the allocated storage that may be stored at a cache and/or metadata repository.

20 Claims, 19 Drawing Sheets

(56) References Cited

U.S. PATENT DOCUMENTS

| | | | | |
|---|---|---|---|---|
| 2001/0034788 | A1* | 10/2001 | McTernan | H04L 69/163<br>348/E13.071 |
| 2011/0107053 | A1* | 5/2011 | Beckmann | G06F 3/0683<br>711/E12.001 |
| 2012/0023291 | A1* | 1/2012 | Zeng | G06F 12/0653<br>711/E12.019 |
| 2014/0195769 | A1* | 7/2014 | Kaiser | G06F 11/00<br>711/171 |
| 2014/0281305 | A1* | 9/2014 | Tse | G06F 11/0778<br>711/162 |
| 2015/0081353 | A1* | 3/2015 | Schuster | G06Q 10/063<br>705/7.11 |
| 2015/0242139 | A1* | 8/2015 | Moore | G06F 3/064<br>711/114 |
| 2016/0139815 | A1* | 5/2016 | Levy | G06F 3/0644<br>711/158 |
| 2017/0061138 | A1* | 3/2017 | Lambert | H04L 63/18 |
| 2017/0269862 | A1* | 9/2017 | Agombar | G06F 3/0647 |
| 2018/0025022 | A1* | 1/2018 | Van Riel | G06F 12/109<br>707/620 |
| 2018/0300242 | A1* | 10/2018 | Liu | G06F 16/00 |
| 2019/0079679 | A1* | 3/2019 | Venkatesan | G06F 3/0689 |
| 2019/0340263 | A1* | 11/2019 | Porat-Stoler | G06F 16/1752 |
| 2020/0192871 | A1* | 6/2020 | Hirsch | G06F 16/1748 |
| 2020/0341661 | A1* | 10/2020 | Liu | G06F 3/0631 |
| 2021/0141775 | A1* | 5/2021 | Keymolen | G06F 16/215 |
| 2021/0240718 | A1* | 8/2021 | Kondiles | G06F 16/24532 |

* cited by examiner

300

| STORAGE METADATA | | | |
|---|---|---|---|
| CONTAINER_ID | SUBSYSTEM | HEALTHY | LAST_HEALTH_TIME |
| 100,000-199,999 | STORAGE1 | YES | 2/12/2020 22:22 |
| 200,000-299,999 | STORAGE2 | YES | 2/17/2020 22:22 |
| 300,000-399,999 | STORAGE3 | YES | 2/17/2020 22:22 |

| STORAGE METADATA | | | | | | |
|---|---|---|---|---|---|---|
| Copy | HintSizeInBytes | Container_ID | Segment_Byte_Ranges | Segment_Start | Segment_End | Last_Update_Time |
| 2 | 20000000 | 200,063 | [6000,12005,6000009] | 1 | 3 | 2/17/2020 22:22 |
| 1 | 20000000 | 100,000 | [6000, 12005, 600009] | 1 | 3 | 2/17/2020 22:22 |
| 1 | 20000000 | 200,003 | [600010,606102,...] | 4 | 900 | 2/17/2020 22:22 |
| 2 | 20000000 | 386,007 | [600010,606102] | 3 | 4 | 2/17/2020 22:22 |
| 2 | 20000000 | 391,002 | [606103,606104,...] | 5 | 900 | 2/17/2020 22:22 |

SYSTEMS, METHODS, AND APPARATUSES FOR STORAGE MANAGEMENT

CROSS-REFERENCE TO RELATED APPLICATION

This application is a continuation application of U.S. patent application Ser. No. 18/309,426, filed Apr. 28, 2023, which is a continuation application of U.S. patent application Ser. No. 17/181,625, filed Feb. 22, 2021, now U.S. Pat. No. 11,683,373, which claims the benefit of priority of U.S. Provisional Application No. 62/978,974, filed Feb. 20, 2020, the contents of which are herein incorporated by reference in their entireties.

BACKGROUND

Remote and/or cloud-based storage of content items offers users greater flexibility and access to more content. As the amount of available content has increased, the cost of storing this content in a cloud storage system has increased. Maintaining such a cloud storage system may be costly and burdensome. The burden is even greater for content items using concatenation of Adaptive Bitrate Video (ABR) content segments that increase delivery complexity for application tiers that provide content items stored at the cloud storage system. Further, such cloud storage systems require significant ingress and egress and Inputs/Outputs per Second (IOPS) to a storage subsystem as well as increased network bandwidth. These and other considerations are addressed herein.

SUMMARY

It is to be understood that both the following general description and the following detailed description examples only and are not restrictive, as claimed. Methods, systems, and apparatuses for storage management are described herein.

A storage system, such as a cloud storage system, a cloud digital video recorder (DVR) platform, and/or the like may store content segments of content items. The content items may be and/or include video content items, audio content items, textual content items, photographic content items, and the like. The storage system, based on an estimate of the storage capacity of storage devices in the storage subsystem, may use a unique content identification scheme to distribute and store unique copies of segments of a content item across the storage devices. Such distributing and storing unique copies of content segments may facilitate improved storage and management of subsequent requests for content segments.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples, and together with the description, serve to explain the principles of the methods and systems:

FIG. 3 shows a table of example metadata;

FIG. 6 shows a table of example metadata;

DETAILED DESCRIPTION

Figure 1:
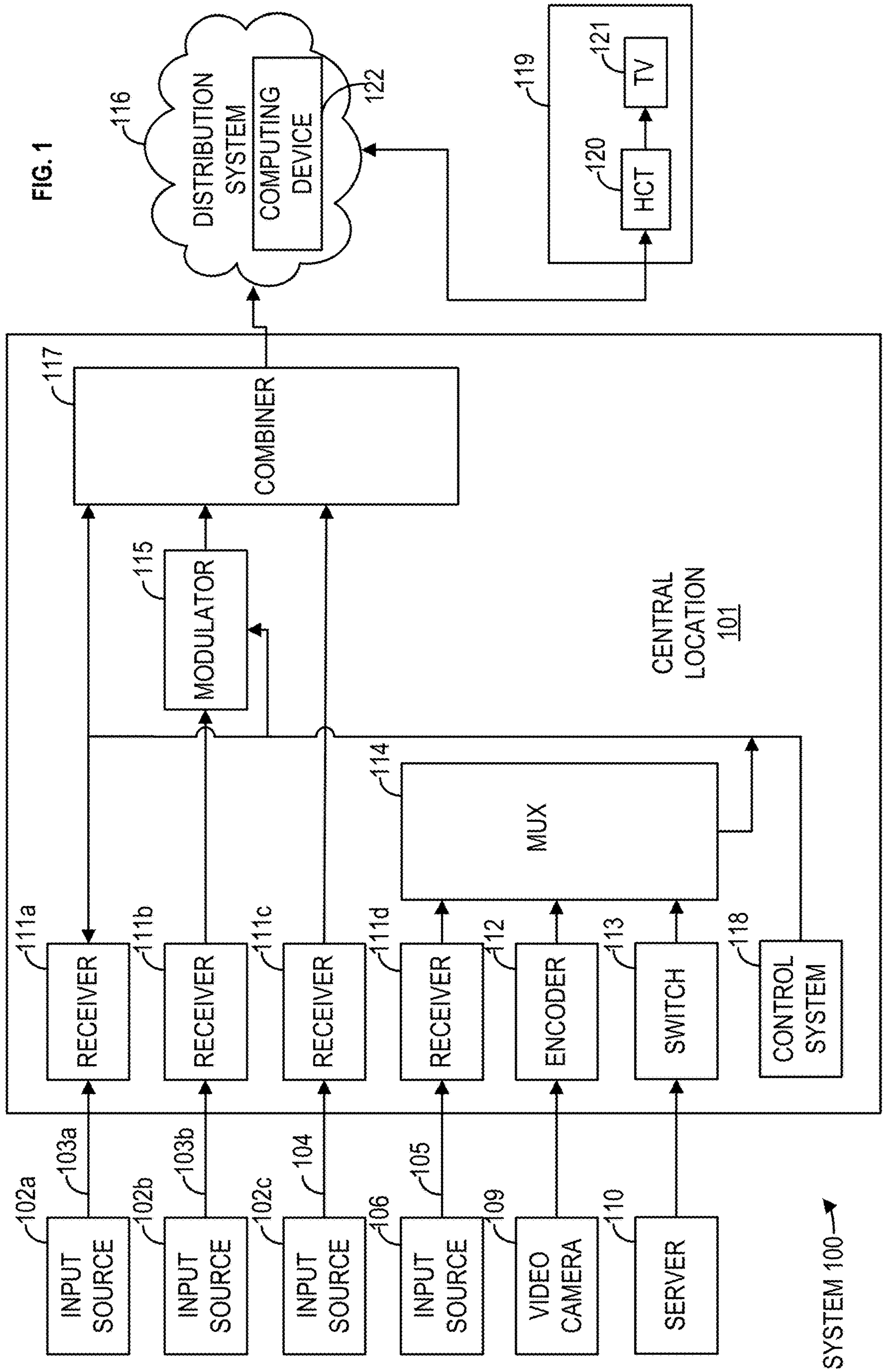
FIG. 1 shows a block diagram of an example system.

Before the present methods and systems are described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another example includes from the one particular value and/or to the other particular value. Similarly, when values are expressed as approximations, by use of the antecedent "about," it will be understood that the particular value forms another example. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Such as" is not used in a restrictive sense, but for explanatory purposes.

Described are components that may be used to perform the described methods and systems. These and other components are described herein, and it is understood that when combinations, subsets, interactions, groups, etc. of these components are described that while specific reference of each various individual and collective combinations and permutation of these may not be explicitly described, each is specifically contemplated and described herein, for all methods and systems. This applies to all aspects of this application including, but not limited to, steps in described methods. Thus, if there are a variety of additional steps that may be performed it is understood that each of these additional steps may be performed with any specific example or combination of examples of the described methods.

The present methods and systems may be understood more readily by reference to the following detailed description and the examples included therein and to the Figures and their previous and following description. As will be appreciated by one skilled in the art, the methods and systems may take the form of hardware, entirely software, and/or a combination of software and hardware. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, flash memory internal or removable, or magnetic storage devices.

The methods and systems are described below with reference to block diagrams and flowcharts of methods, systems, apparatuses, and computer program products. It will be understood that each block of the block diagrams and flowcharts, and combinations of blocks in the block diagrams and flowcharts, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

FIG. 1 shows an example system 100. Those skilled in the art will appreciate that present methods may be used in systems that employ both digital and analog equipment. One skilled in the art will appreciate that provided herein is a functional description and that the respective functions may be performed by software, hardware, or a combination of software and hardware.

The system 100 may include a central location 101 (e.g., a headend), which may receive content (e.g., video, audio, images, text, application files, data, input programming, and the like) from multiple sources. The central location 101 may combine the content from the various sources and may distribute the content to user (e.g., subscriber) locations (e.g., location 119) via distribution system 116.

For example, the central location 101 may receive content from a variety of sources 102*a*, 102*b*, 102*c*. The content may be transmitted from the source to the central location 101 via a variety of transmission paths, such as wireless paths (e.g. satellite paths 103*a*, 103*b*) and terrestrial path 104. The central location 101 may also receive content from an input source 106 via a direct line 105. Other input sources may comprise capture devices, such as a video camera 109, a server 110, and/or the like. The content provided by the content sources may comprise a single content item, a portion of a content item (e.g., content fragment or content segment), a content stream, a multiplex that includes several content items, and/or the like.

The central location 101 may comprise one or a plurality of receivers 111*a*, 111*b*, 111*c*, 111*d* that are associated with one or more corresponding input sources. The central location 101 may comprise one or more encoders 112, switches 113, multiplexers, and/or the like. For example, an encoder 112 may compress, encrypt, transform, and/or otherwise encode content. As a further example, the encoder 112 may encode content based on one or more compression standards, such as MPEG. The encoder may receive content from the video camera 109 and/or other source and apply one or more encoding algorithms to the received content. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer 114.

The central location 101 may comprise one or more modulators 115 for interfacing with a distribution system 116. For example, a modulator may receive content from a receiver 111, encoder 112, multiplexer 114, and/or the like. A modulator 115 may convert the received content into a modulated output signal suitable for transmission over the distribution system 116. For example, a modulator 115 may map portions of the content to data bits expressed as signals (e.g., sinusoidal signals) at corresponding subcarrier frequencies of a data symbol. The output signals from the modulators 115 may be combined, using equipment such as a combiner 117, for input into the distribution system 116.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators for setting operating parameters, such as system specific MPEG table packet organization or conditional access information. The control system 118 may be located at central location 101 or a remote location.

The distribution system 116 may distribute content from the central location 101 to user locations, such as user location 119. The distribution system 116 may be an optical fiber network, a coaxial cable network, a hybrid fiber-coaxial network, a wireless network, a satellite system, a direct broadcast system, or any combination thereof. There may be a multitude of user locations connected to distribution system 116. At user location 119, a decoder 120, such as a gateway or home communications terminal (HCT) may decode, if needed, the signals for display on a display device, such as on a television set (TV) 121 or a computer monitor. Those skilled in the art will appreciate that the signal may be decoded in a variety of equipment, including an HCT, a computer, a TV, a monitor, or a satellite dish. The methods and systems disclosed may be located within, or performed on, one or more HCT's 120, TV's 121, central locations 101, DVR's, home theater PC's, and the like. The distribution system may use any method of transmitting a signal to distribute content. A method of transmitting a signal may comprise any messaging protocol, including internet protocol (IP). A method of transmitting a signal may comprise any messaging standard, including data over cable service interface specification (DOCSIS).

For example, user location 119 is not necessarily fixed. By way of example, a user may receive content from the distribution system 116 on a mobile device such as a laptop computer, PDA, smartphone, GPS, vehicle entertainment system, portable media player, and the like.

For example, the methods and systems disclosed may be located within one or more local and/or remote computing devices 122, such as a cloud DVR, in the distribution system 116. For example, one or more HCT's 120 may transmit a plurality of requests to store a content item in one or more local and/or remote computing devices 122. The one or more local and/or remote computing devices 122 may force each recording corresponding to the plurality of requests to be the same size—comprising the earliest requested start time and the latest requested end time. For example, at a later time, persistent storage (e.g., an archival system, disk array, non-volatile memory system, etc.) of a storage subsystem may be used to reduce the copies of the content item to one copy during a de-duplication operation.

For example, one or more HCT's 120 may transmit a plurality of requests to playback stored content from one or more local and/or remote computing devices 122. The one or more local and/or remote computing devices 122 may store a mapping of the one or more HCT's 120 with the content requested for each of the one or more HCT's 120. The stored mappings in the one or more local and/or remote computing devices 122 may comprise a requested start time and a requested end time. For example, one of the one or more HCT's 120 may request playback of the content item. For example, the one or more local and/or remote computing devices 122 may transmit the content item, starting at the start time mapped to the HCT requesting playback and terminating at the end time mapped to the HCT requesting playback.

Figure 2:
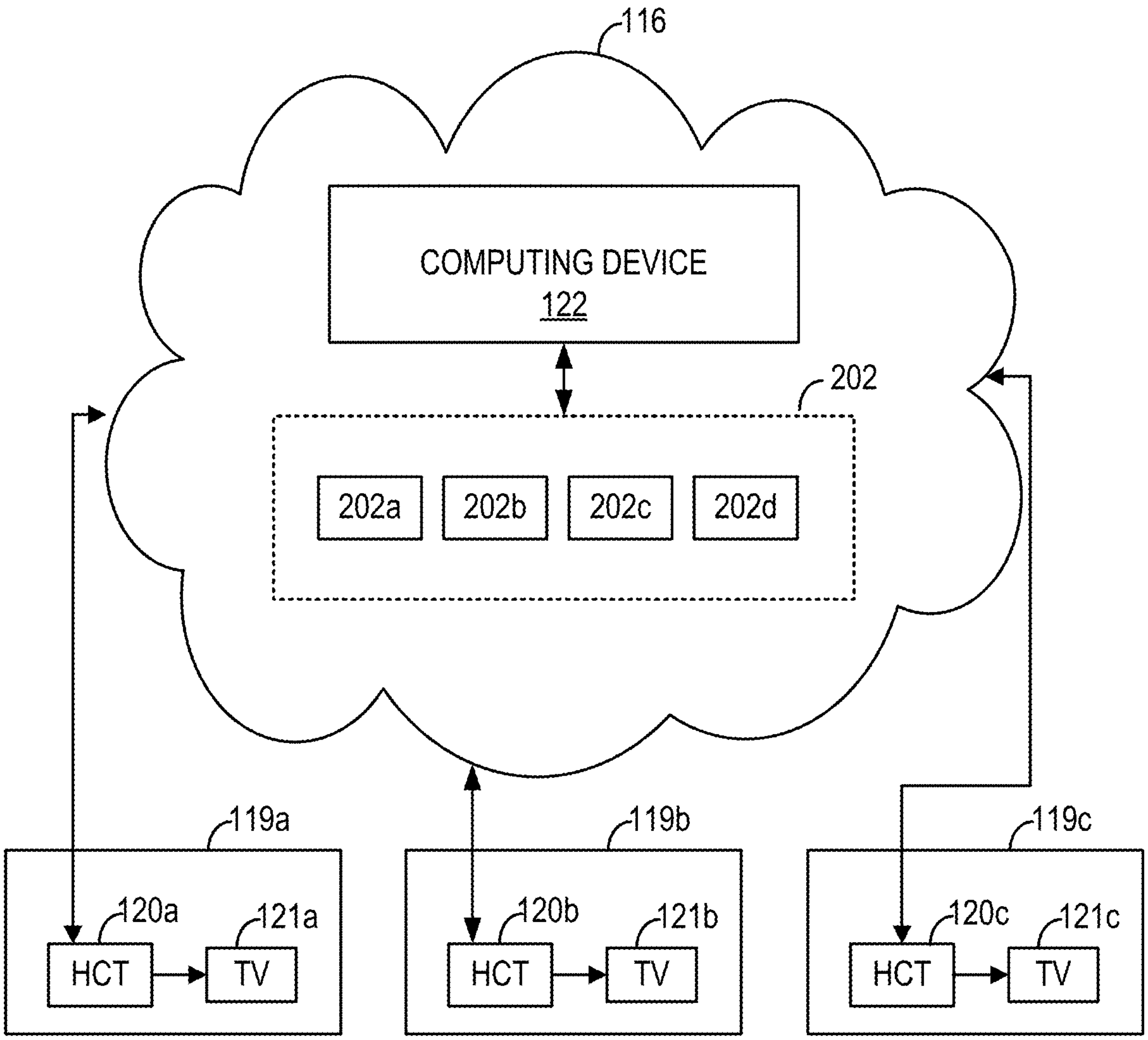
FIG. 2 shows a block diagram of an example system.

FIG. 2, shows a block diagram of an example system that may implement storage management. For example, one or more HCT's 120*a*, 120*b*, 120*c* in communication with one or more TV's 121*a*, 121*b*, 121*c* at one or more premises 119*a*, 119*b*, 119*c* may communicate with one or more network devices, such as one or more local and/or remote computing devices 122 in a distribution system 116. The one or more local and/or remote computing devices 122 may comprise a storage subsystem 202. Optionally, the storage subsystem 202 may be removable and/or remote from the one or more local and/or remote computing devices 122. The storage subsystem 202 may be used for cloud-based storage of content items and/or video content that utilizes Adaptive Bitrate Video ("ABR").

In ABR, video linear packagers typically fragment video content into 2-second content segments. Due to the real-time streaming nature of video, it is common to record these unique video segments in a cluster of physical storage nodes or distributed object store of a file system, such as the storage subsystem 202. The storage subsystem 202 may be beneficial for write-heavy workloads. The storage subsystem 202, unlike existing storage systems, may write/store subsequent segments for a given unique recording near each other on disk. The storage subsystem 202 may provide sequential deleting and reading of content segments, which may be beneficial for writing unique segments together on a memory disk. The storage subsystem 202 may group subsequent segments for a unique recording as well as group many segments for numerous recordings and writing as a large fanout of objects at a storage subsystem tier. This grouping enables scaling of unique video recording of the storage subsystem 202 may in a cost-effective way. Content segments that make up a single unique recording may be spread across many storages nodes, such as a plurality of storage devices 202*a*, 202*b*, 202*c*, 202*d*.

A local and/or remote computing device 122 may receive requests from several different HCT's 120*a*, 120*b*, 120*c* to store, record, or capture the same content. Each of the requests may comprise a start time and an end time. For example, a request may have the same start time as the start time listed in an electronic programming guide (EPG) for the primary content. For example, a request may have a start time that is some offset of the start time listed in an electronic programming guide (EPG) for the primary content. For example, an offset may be 5 minutes, and the request may have a start time of five minutes before the start time listed in an electronic programming guide (EPG) for the primary content. For example, an offset may be selected from a list of predetermined offset choices. For example, an offset may be manually entered.

For example, each request to store the particular content may be mapped to a profile, user, location 119*a*, 119*b*, 119*c*, and/or device 120*a*, 120*b*, 120*c*, start time, and end time. For example, the earliest start time of the requests for particular content may be determined. For example, the latest end time of the requests for particular content may be determined.

Copies of content and/or a content item may be stored in the storage subsystem 202 of the local and/or remote computing device 122 for each request. Storing copies of content/and or content items enables redundancy. The storage devices 202*a*, 202*b*, 202*c*, 202*d* may be configured to store a segment (portion) and/or a plurality of segments of a content item based on requests (e.g., DVR request, etc.) from one or more user devices, such as HCT's 120*a*, 120*b*, 120*c*. For example, the storage devices 202*a*, 202*b*, 202*c*, 202*d* may store at least one segment of a content item in persistent storage (e.g., an archival system, disk arrays, non-volatile memory system, etc.) of storage subsystem 202. The distribution system 116 may strategically store segments (portions) of content and/or content items in either short-term storage or persistent storage of the storage subsystem 202.

For example, the computing device 122 may cause the storage devices 202*a*, 202*b*, 202*c*, 202*d* to collectively and/or individually allocate storage for a content item based on requests to store segments (portions) of the content item. The HCT's 120*a*, 120*b*, 120*c* may send requests (e.g, DVR request, etc.) to store at least one segment (portion) of a content item. The computing device 122 may estimate the size (e.g., a required storage size, etc.) of the content item and cause the storage devices 202*a*, 202*b*, 202*c*, 202*d* to allocate storage sufficient for the entire content item in anticipation of subsequent request to store additional segments of the content item. The storage devices 202*a*, 202*b*,

202*c*, 202*d* may allocate storage as a single data container and/or a plurality of data containers that are logically associated/referenced. Allocating storage estimated to be sufficient for an entire content item, or a portion thereof, prior to a request to store the entire content item enables segments of the content item to be stored contiguously within the storage subsystem 202.

The one or more user devices, such as HCT's 120*a*, 120*b*, 120*c*, may request playback of the particular content. For example, when one or more of the HCT's 120*a*, 120*b*, 120*c* request playback of the particular content, the start time and end time associated with the corresponding profile, user, location 119*a*, 119*b*, 119*c*, and/or device 120*a*, 120*b*, 120*c* may be retrieved. For example, the content may be transmitted to a user device 120*a*, 120*b*, 120*c*, starting at the retrieved start time and ending at the retrieved end time. For example, a copy of the content may be cropped, wherein the remaining portion of the cropped copy of the content may be the portion starting at the retrieved start time and the ending at the retrieved end time. For example, the cropped content may be transmitted to a user device 120*a*, 120*b*, 120*c*. For example, a copy of the content may be transmitted to the user device 120*a*, 120*b*, 120*c*, wherein the portion of the copy of the content between the determined start time and the retrieved start time may be inaccessible to the user device 120*a*, 120*b*, 120*c* and/or wherein the portion of the copy of the content between the retrieved end time and the determined end time may be inaccessible to the device 120*a*, 120*b*, 120*c*.

For example, a request to store content may comprise an attribute. Any attribute in which a selection of the attribute creates instances of the content that are subsets of instances of the content associated with non-selection or other selections of the attribute may use the methods and systems described herein. For example, a first user could request to store content, but specify that commercials not be stored. In the example, a second user could request to store content, but specify that commercials should be stored. For example, each copy of the stored content may comprise commercials. For example, the attribute may be mapped to the users. In the example, for the attribute "Commercials?," the first user is mapped to "No" and the second user is mapped to "Yes." For example, when the first user requests playback of the content item, the portion of the content item containing commercials may be skipped. For example, the commercials may be skipped using jump points, cropping the commercials out, and/or any other method of skipping content.

FIG. 3 shows a data table 300 showing example storage metadata managed and/or stored by a storage subsystem. The storage subsystem may be the storage subsystem 202 of FIG. 2. The storage subsystem may manage a plurality of storage devices. The plurality of storage devices may each be a storage container, which may be mapped to physical data storage mediums. The physical data storage mediums may each be a suitable storage medium for storing content items, such as hard disk magnetic storage, solid-state magnetic storage, remote servers, and/or the like. The storage containers may contain one or more content segments. The data table 300 shows storage metadata such as location metadata indicative of allocated storage for various content segments. The data table 300 includes columns that are labeled identifier, subsystem, healthy, and last health time. As shown in data table 300, container ranges may be mapped to physical storage devices in which the health of each storage device is tracked. The data table 300 indicates that storage device 1 corresponds to container identifiers 100,000 to 199,999; that storage device 2 corresponds to container identifiers 200,000 to 299,999; and that storage device 3 corresponds to container identifiers 300,000 to 399,999. The data table 300 also indicates that the three storage devices are healthy and the time of this health determination. Individual container IDs may be mapped so they may potentially be moved to different storage devices as part of rebalancing or duplication of content. Decisions made by the storage subsystem to move content segments to and from different storage devices based on location metadata may improve the storage efficiency of the storage subsystem.

Figure 4:
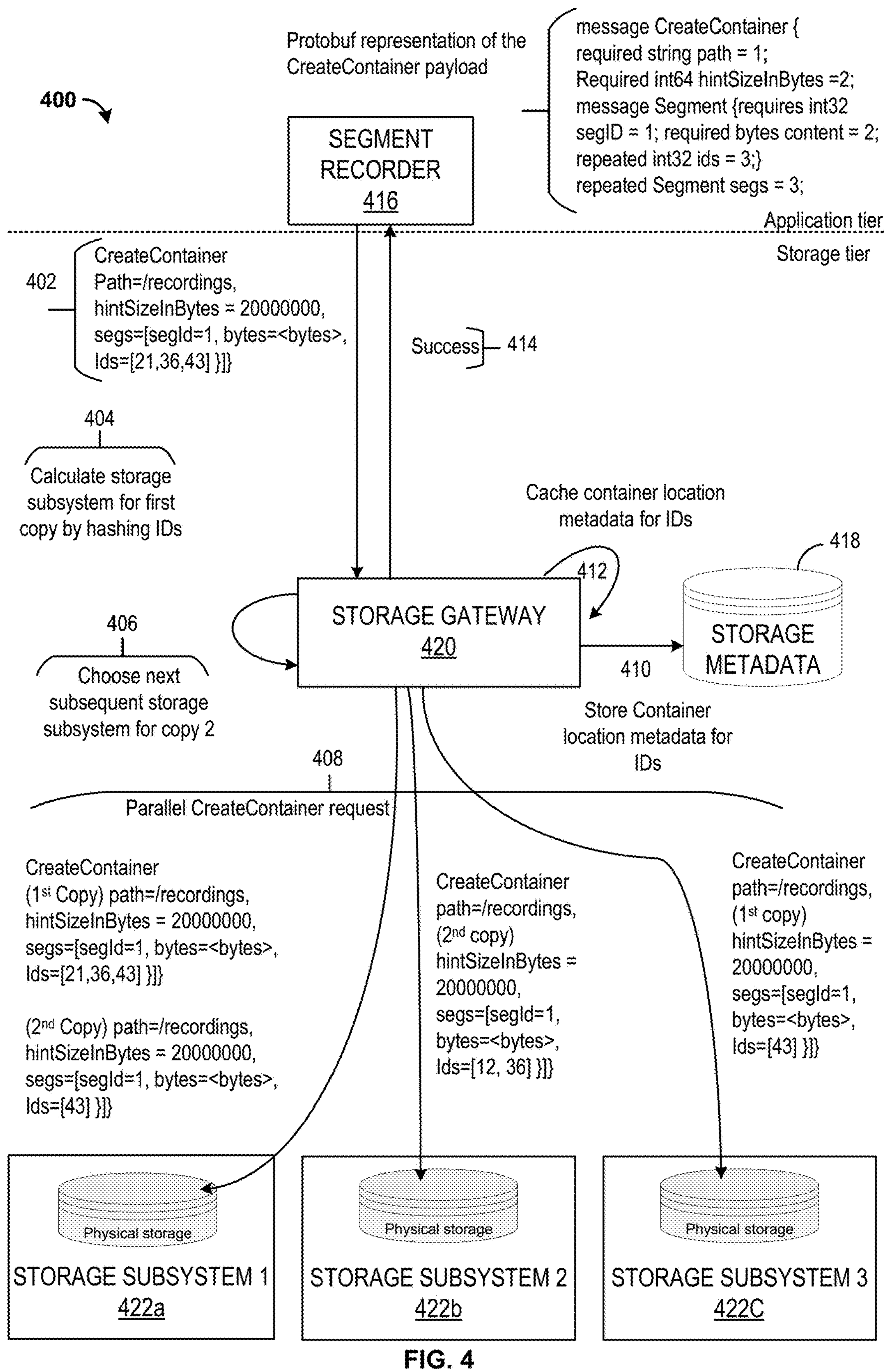
FIG. 4 shows a block diagram of an example system.

Requests sent to the storage subsystem may be persistently stored in a metadata store, such as a cache or metadata repository. These requests may be part of storage location metadata. The storage location metadata may include a content segment identifier, a quantity of bytes required to store the content segment, storage container identifier, storage device identifier, user identifier, content item identifier, and the like. The storage location metadata may be used by the storage subsystem for lookup requests and rebalancing content when the replicated content (or erasure-coded content) falls below a minimum threshold for redundancy. For example, FIG. 4 shows copies stored in a storage system configured for 2-way replication. Other thresholds for redundancy are also possible, including 3-way replication, 4-way replication, 5-way replication, and the like, for example. In general, N-way replication refers to redundantly storing a particular unique content segment in a number of storage devices equivalent to N. The threshold for redundancy may depend on a desired level of data security/redundancy. Redundant content segments may correspond to multiple requests by different users of a content delivery network for the same content segment.

Storage containers created for each copy of a byte range may be written to different physical host storage devices. Various instances of storage containers may host or store different numbers of content segments stored into the respective storage container. For example, a first redundant copy of a set of content segments may be stored using three different storage containers while a second redundant copy of the set of content segments may be stored using two different storage containers. After persistent write operations to the storage location metadata, a storage gateway of the storage subsystem may cache this information in the metadata store so that subsequent requests do not require a lookup to the persistent metadata.

FIG. 4 is a block diagram showing an example system 400 that may be used to create a storage container at a storage subsystem. The storage subsystem may be the storage subsystem 202 of FIG. 2. The system 400 may include a segment recorder 416 for recording content items. The system 400 may include a storage metadata store 418 for storing location metadata. The storage metadata store 418 may be a cache, repository, or the like. The system 400 may include a storage gateway 420, which manages the creation of storage containers. The system 400 may include storage devices 422*a*, 422*b*, 422*c*, which may be physical storage containers that the created storage containers are mapped to. The storage gateway 420 may use the CreateContainer payload to support sending one or more content segments to be uniquely stored and associated by one or more unique IDs. This allows the storage subsystem to optimize the storage IOPs and layout by positioning subsequent segments next to each other with sequential writes.

Furthermore, a hintSizeInBytes parameter of a CreateContainer request for approximating an estimated storage size of all segment recordings for each unique identifier (e.g., user identifier, content item identifier, etc.), may be passed along in the payload. This provides the storage gateway 420 advance knowledge of the expected size of the content for a completed recording. The complete content may refer to all recorded segments belonging or corresponding to a particular user or all recorded segments corresponding to a particular content item. This way, all segments corresponding to the same user or the same content item may be stored at the same storage container or storage node. The storage gateway 420 may perform a hashing function with the unique identifier to determine which storage container or node should receive all segments associated with requests sent by a particular user and/or for a specific content item. The storage gateway 420 may use the hintSizeInBytes parameter to improve the reservation of sequential disk space in the storage containers/storage devices. That is, the hintSizeInBytes parameter passed as part of a CreateContainer request may enable the storage gateway 420 to reserve an allocation of storage space within a storage container (e.g., at storage devices 422*a*, 422*b*, 422*c*). This storage space reservation may be in an optimized layout based on an initially determined storage container size.

FIG. 4 shows the CreateContainer request flow for the system 400. The segment recorder 416 may be located in an application tier of the system 400. At step 402, a request to start to record or store a content segment may generate a CreateContainer request for one or more unique recording identifiers (e.g., identifiers 21, 36, and 43). The hintSizeInBytes parameter may be 20000000. At step 404, the storage gateway 420 may calculate or determine the physical storage device(s) for storing a first copy of the content segments associated with the unique identifier by hashing the identifiers. At step 406, the storage gateway 420 may chose the storage device(s) for storing a second copy of the content segments associated with the unique identifier. This determination of storage device(s) for the second copy may be based on location metadata, allocated storage, the hintSizeInBytes parameter, and other suitable information. Upon determining how the two copies should be stored, at step 408, the storage gateway 420 may create parallel CreateContainer requests. At step 410, the storage gateway 420 may store container location metadata for each unique identifier. At step 412, the storage gateway 420 may cache container location metadata for the identifiers at a cache or metadata repository, for example. At step 412, the execution of the CreateContainer requests may terminate.

The parallel request for the two copies is indicative of two-way replication because each of the two copies is stored in at least two separate storage devices. The first storage device 422*a* may contain the first and second copies. The storage device 422*b* may contain the second copy. The storage device 422*c* may contain the first copy. The first copy at storage device 422*a* may correspond to unique identifiers 21 and 36 (e.g., different users corresponding to identifiers 21 and 36 both requested the content segments of the first copy). The second copy at storage device 422*b* may correspond to unique identifier 43 (e.g., a user corresponding to identifier 43 requested the content segments of the second copy).

The system 400 may use 2-way replication to ensure the CreateContainer request is satisfied for all unique IDs with the first segment being carried along with the request. Network Redundant Array of Independent Disks (RAID) or erasure coding may be used when bytes corresponding to a content segment storage request are sliced into a defined width and sent to a set of storage devices. Bytes on the network may be minimized as the storage gateway 420 handles the individual container creation for unique segments per each unique identifier.

Figure 5:
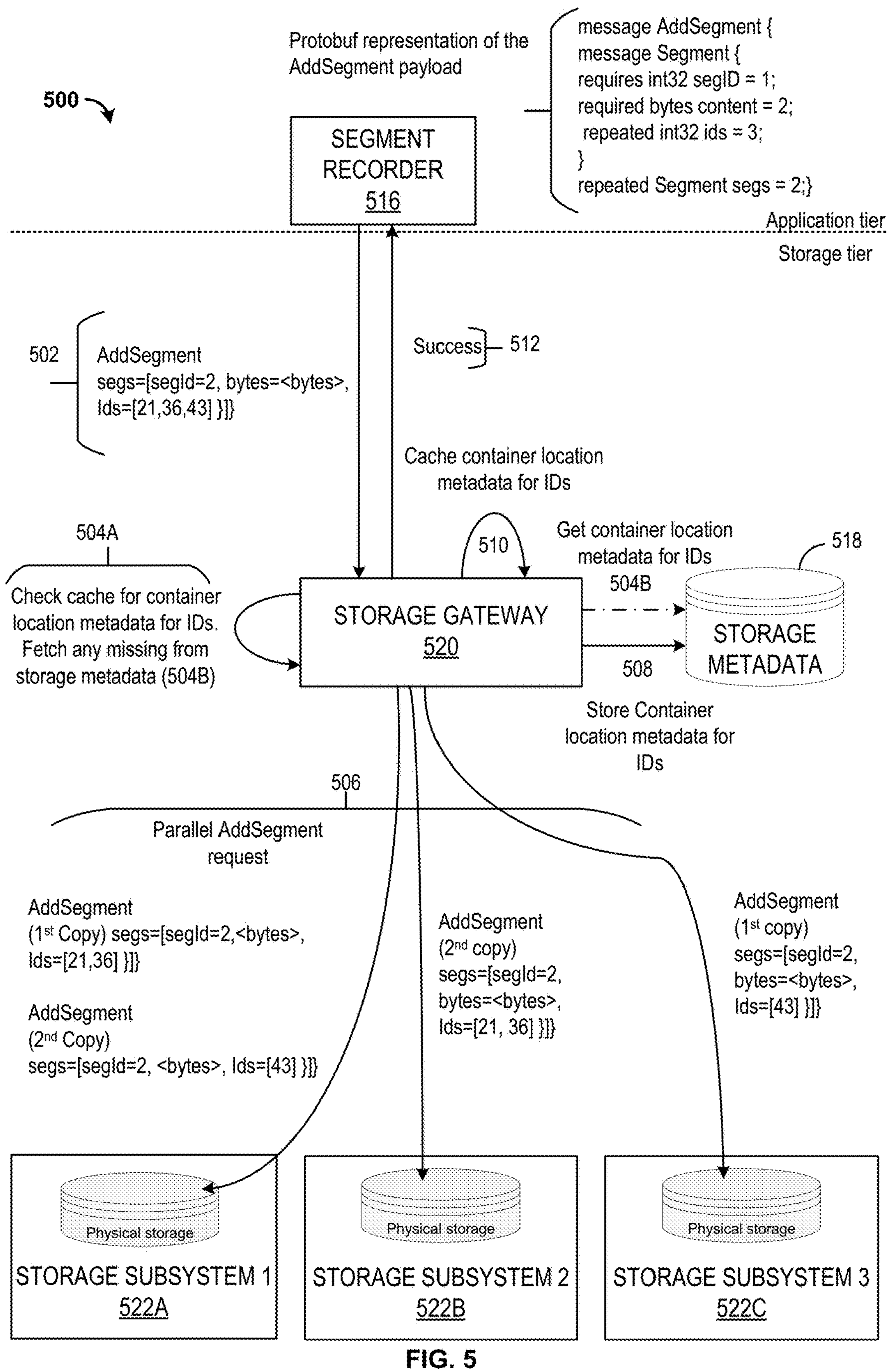
FIG. 5 shows a block diagram of an example system.

FIG. 5 shows a system 500 that may be used to add segments to a storage container request by a storage subsystem. The storage subsystem may be the storage subsystem 202 of FIG. 2. The system 500 may correspond to the system 400 of FIG. 4. The system 500 may include a segment recorder 516 for recording content items. The system 500 may include a storage metadata store 518 for storing location metadata. The storage metadata store 518 may be a cache, repository, or the like. The system 500 may include a storage gateway 520, which manages the creation of storage containers. The system 500 may include storage devices 522*a*, 522*b*, 522*c*, which may be physical storage containers that created storage containers are mapped to. The storage gateway 520 may use the CreateContainer payload to support sending one or more content segments to be uniquely stored and associated by one or more unique IDs. This may allow the storage subsystem to optimize the storage IOPs and layout for additional requests for subsequent content segments by positioning subsequent segments next to each other with sequential writes.

The system 500 may be used to implement an AddSegment request flow from the segment recorder 516 to the storage tier. Subsequent segment requests after a CreateContainer request, as described with reference to FIG. 4, may generate an AddSegment request for one or more unique recording identifiers. The system 500 may implement 2-way replication to ensure the AddSegment request is satisfied for all unique IDs. At step 502, a request to store a further content segment may trigger the AddSegment request for one or more unique recording identifiers (e.g., identifiers 21, 36, and 43). At step 504A, the storage gateway 420 may check a local cache is checked for the corresponding metadata, as each AddSegment request is received. Any metadata not found for a unique ID may be looked up in the storage metadata store database 518. At step 504B, the storage gateway 520 may obtain the container location metadata for the identifiers of the AddSegment request and track the container location metadata in the storage metadata store 518. At step 506, the storage gateway 4520 may create parallel AddSegment requests. The first storage device 522*a* may contain the first and second copies. The storage device 522*b* may contain the second copy. The storage device 522*c* may contain the first copy. At step 512, the execution of the AddSegment requests may terminate. The second copy may be associated with a unique ID that is unrelated to a unique ID in the first copy. For example, the first and second copies may be associated with different user devices and/or request for storage.

FIG. 6 shows a data table 600 that shows the handling of an example playback request of a content segment by a storage subsystem. The storage subsystem may be the storage subsystem 202 of FIG. 2. The data table 600 may be indicative of storage metadata. The first column of data table 600 identifies a selected unique identifier. The second column of data table 600 identifies the copy instance (e.g., first copy or second copy) corresponding to the selected unique identifier. The third column of data table 600 identifies the hintSizeInBytes parameter. The fourth column of data table 600 identifies container identifier. The fifth column of data table 600 identifies segment byte range arrays. The sixth column of data table 600 identifies a starting content segment of the segments identified by the corresponding row. The seventh column of data table 600 identifies an ending content segment of the segments identified by the corresponding row. The eighth column of data table 600 identifies a last update time parameter indicating the last time that content segment storage metadata was updated.

The data table 600 shows an example of a playback flow. A start and end byte offset into a particular storage container may be found by looking up the storage container and Segment_Byte_Ranges by first choosing a copy, in which the playback request format is as follows: ID={ID}, Copy={COPY}, and {SegID} BETWEEN Segment_Start AND Segment_END. For example, content segment ID=3 is found in the first row of the data table 600 and the byte range (12006-600009) is determined by taking the taking the third element (e.g., 600009 in the segment byte range array of the third row of data table 600) of the segment byte range array of the third row in the data table 600 as the ending byte and the first byte is a one byte increment from the second element (e.g., 12005 in the segment byte range array of the third row of data table 600) in the segment byte range array.

Figure 7:
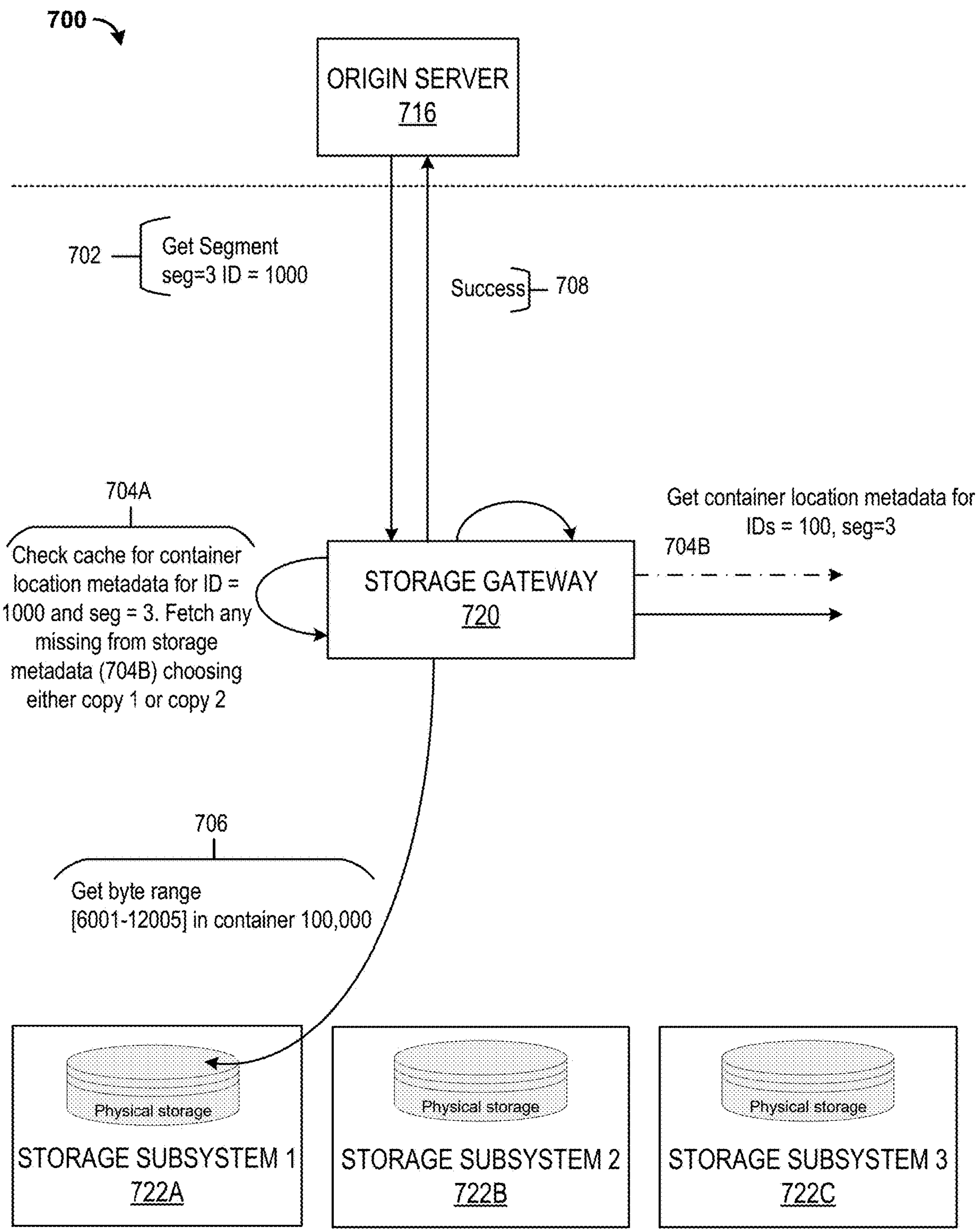
FIG. 7 shows a block diagram of an example system.

FIG. 7 shows a system 700 that may be used to implement an example process to handle a content segment playback request by an origin server and a storage subsystem. The storage subsystem may be the storage subsystem 202 of FIG. 2. The system 600 may correspond to the system 400 of FIG. 4 and/or the system 500 of FIG. 5. The system 700 may include a storage gateway 720, which may receive a request from an origin server 716. The system 700 may include an origin server 716, which may be part of an application tier. The system 700 may include storage devices 722*a*, 722*b*, 722*c*, which may be physical storage containers to which created storage containers may be mapped. The request received from the origin server 716 by the storage gateway 720 may indicate one or more content segments associated with a unique identifier. For example, multiple segments may be requested in a single request from the origin server 716. At step 702, the storage gateway 720 may obtain the requested content segment(s), such as segment 3 corresponding to identifier 1000. The storage gateway 720 may send one or more larger byte range requests to the appropriate storage device (e.g., storage device 722*a* depicted in block diagram 700). These larger byte range requests may be the concatenation of smaller ABR segments of a specific content item. These larger byte range requests may be sequential read operations by the storage subsystem if any requested subsequent segments were written into the same container. At step 704A, the storage gateway 720 may check a local cache for container location metadata corresponding to the requested content segment(s). Any metadata not found may be looked up in a storage metadata store. For example, at step 704A, the storage gateway 720 may retrieve metadata at the corresponding location metadata for identifier 1000 in the storage metadata store. The retrieved metadata may be used to retrieve the requested byte range in storage device 722*a*. For example, at step 706, the storage gateway 720 may obtain the byte range [6001-12005] in container 100, 000 of storage device 722*a*. At step 708, the handling of a content segment playback request may terminate when the storage gateway 720 sends the requested content segment(s) to the origin server 716.

Figure 8:
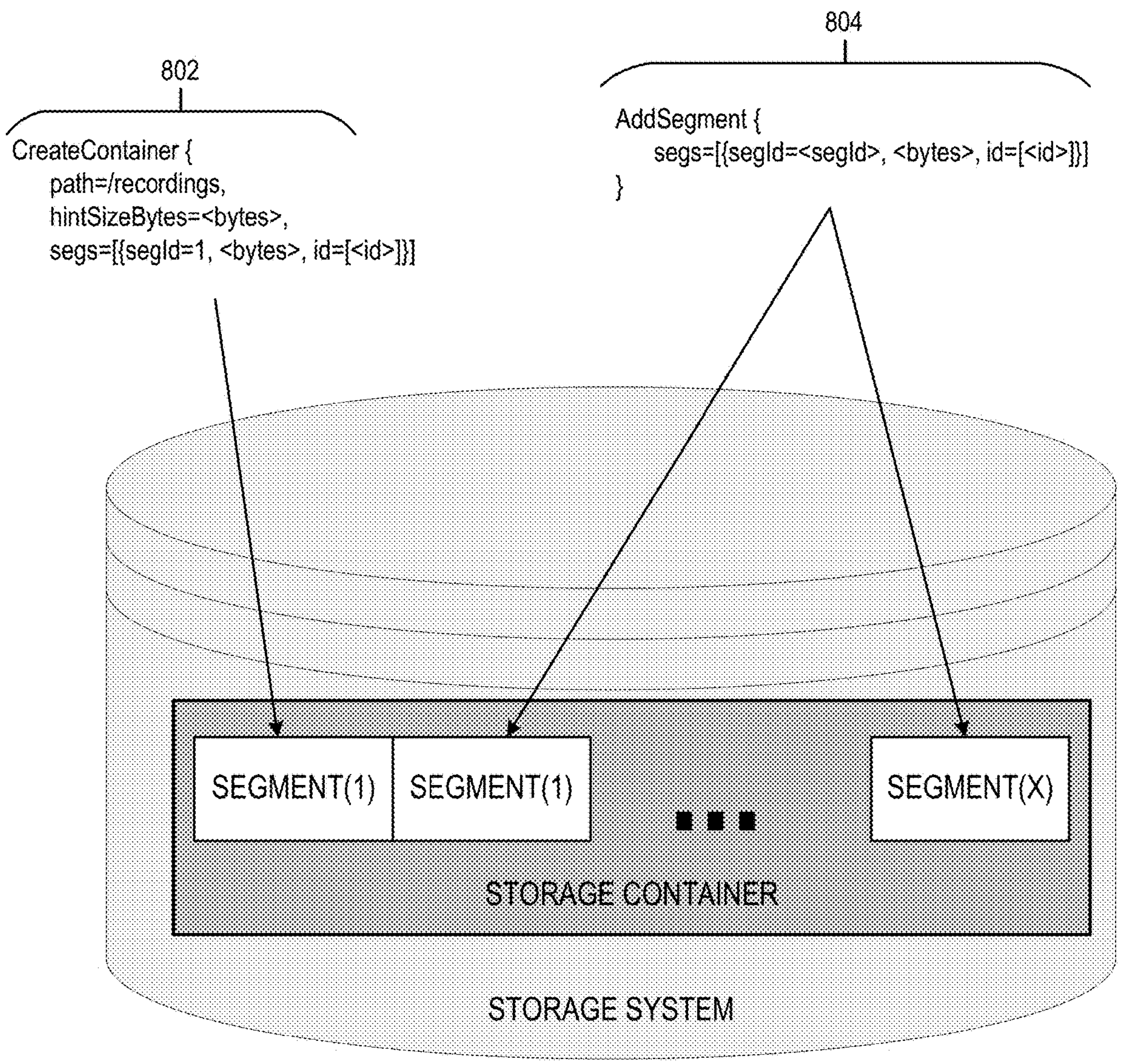
FIG. 8 shows a block diagram of an example storage device.

FIG. 8 is a block diagram of an example storage device 800. The storage device 800 may include storage containers. Each storage container may include multiple content segments, including content segment (1), content segment (2), and including segments up to content segment (x) in which x indicates the total number of content segments stored in the storage container. The storage device 800 may be used to implement a process of creating and adding to storage containers. For example, a full storage container size in bytes may be sequentially reserved across the storage subsystem as best fit by an underlying subsystems, such as a files ystem and/or physical media. At step 802, a storage gateway may generate a CreateContainer request with a hintSizeBytes parameter. The hintSizeBytes parameter may be, for example, 20 MB. The CreateContainer request may cause the storage device 800 to reserve sufficient, contiguous capacity so that content segments may be reserved or allocated sufficient storage space based on the hintSizeBytes parameter. Upon reservation of the necessary allocated storage space in the created storage device 800, AddSegment requests may be fulfilled. At step 804, a storage gateway may generate subsequent AddSegment requests and fulfill the requests in a way such that content segments associated with a unique identifier are stored contiguously within the storage device 800. For example, storage devices may allocate storage as a single data container and/or a plurality of data containers that are logically associated/referenced. Allocating storage estimated to be sufficient for an entire content item, or a portion thereof, prior to a request to store the entire content item enables segments of the content item to be stored contiguously, for example, within a storage subsystem (e.g., the plurality of storage devices, etc.).

Figure 9:
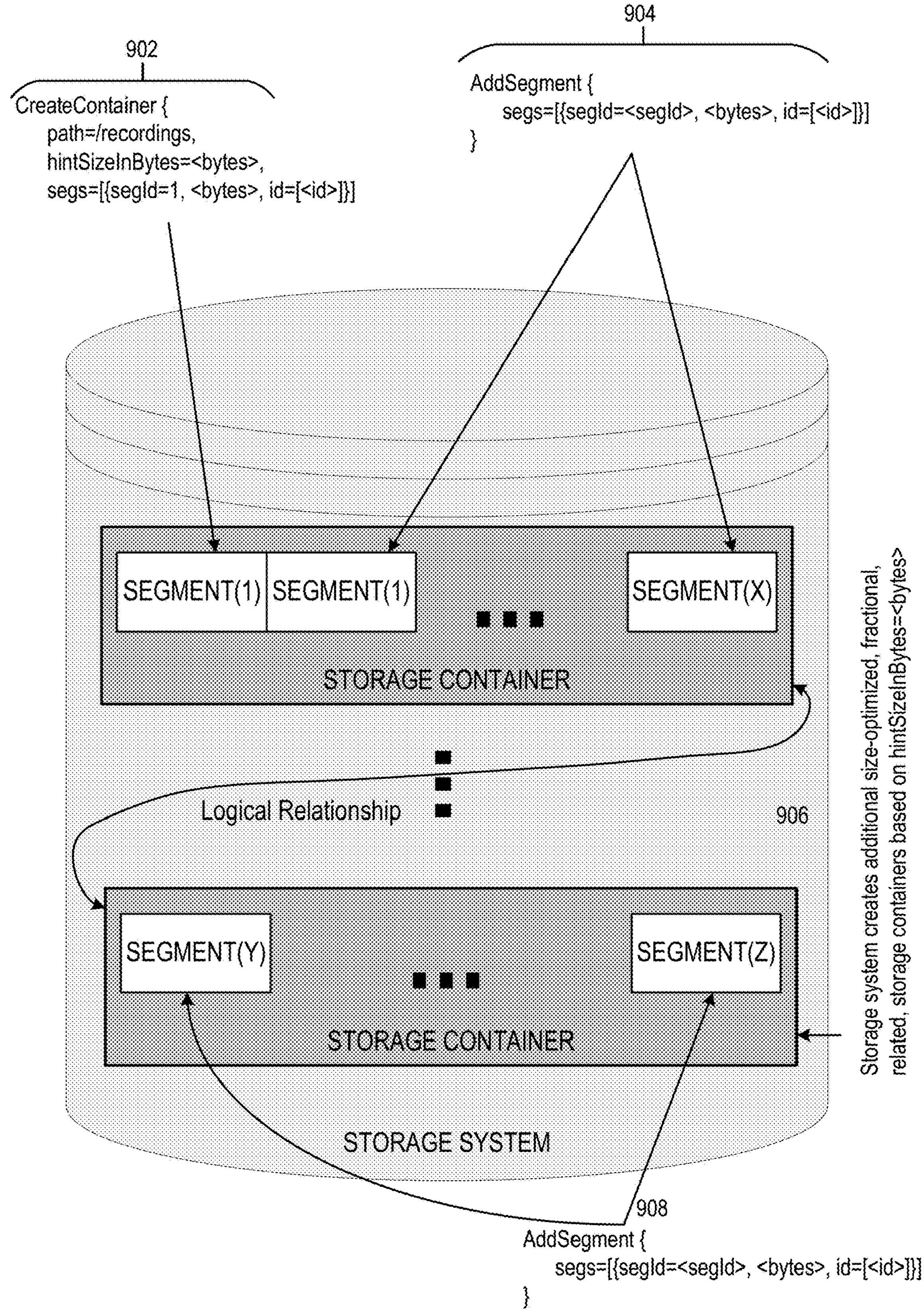
FIG. 9 shows a block diagram of an example storage device.

FIG. 9 shows a storage device 900 of a storage system. The storage device 900 may include storage containers. Each storage container may include multiple content segments. The storage device 900 may implement a process of creating and adding to extended storage containers. A hintSizeInBytes parameter may be used to reserve an allocation of storage space within the storage device 900. At step 902, a storage gateway may generate a CreateContainer request to create a new storage container at the storage device 900. At step 904, the storage gateway may generate AddSegment requests to add content segments to a newly created storage container at the storage device 900. The storage gateway may determine that the newly created storage container at the storage device 900 is filled (e.g., insufficient available storage capacity of the storage container, etc.) because the reserved storage availability (e.g., an allocated amount, etc.) was not sufficient to accommodate all of the AddSegment requests generated by the storage gateway.

A hintSizeInBytes (e.g., an estimated size of content, etc.) may be to large, for example, in a situation where a recorded content item is terminated before complete recording and/or prematurely ends. In this case, the storage system may be signaled, for example, from the application tier, that no additional content will be sent. to the storage tier. A determination that no additional content will be sent/received may be based on a duration between the last writes, for example, when a container size is 50% full and no writes have been sent/received for 5 mins (or any other duration). Releasing this capacity (e.g., allocated storage, etc.) may allow a compaction process to rearrange storage containers and optimize sequential space on the drives of storage devices.

The reserved storage may be reserved based on a hintSizeInBytes parameter passed through the CreateContainer request. As such, the allocation of storage space anticipated by the hintSizeInBytes parameter may be an underestimate. In this situation, additional related storage containers may be created at the storage device 900. At step 906, the storage gateway may create, based on the hintSizeInBytes parameter, additional size-optimized and fractional storage containers that are logically related to the newly created storage container at the storage device 900. The logically related storage containers may also be logically associated with the allocated storage specified by the hintSizeInBytes parameter. The logically related storage containers may be used by the storage system to balance and/or redistribute content segments, including stored content segments and subsequently received content segments. At step 908, content segments of subsequent AddSegment requests may be added to the logically related storage containers at the storage device 900, which may be considered extended storage containers. The storage system may, for example, create the extended storage containers at the storage device 900 due to the storage system not allocating the full reserved storage availability specified by the hintSizeInBytes parameter. Instead, the storage system may create and extend storage containers at the storage device 900 on demand due to an optimized fit of underlying subsystems such, as a file system, physical media, and/or the like.

Figure 10:
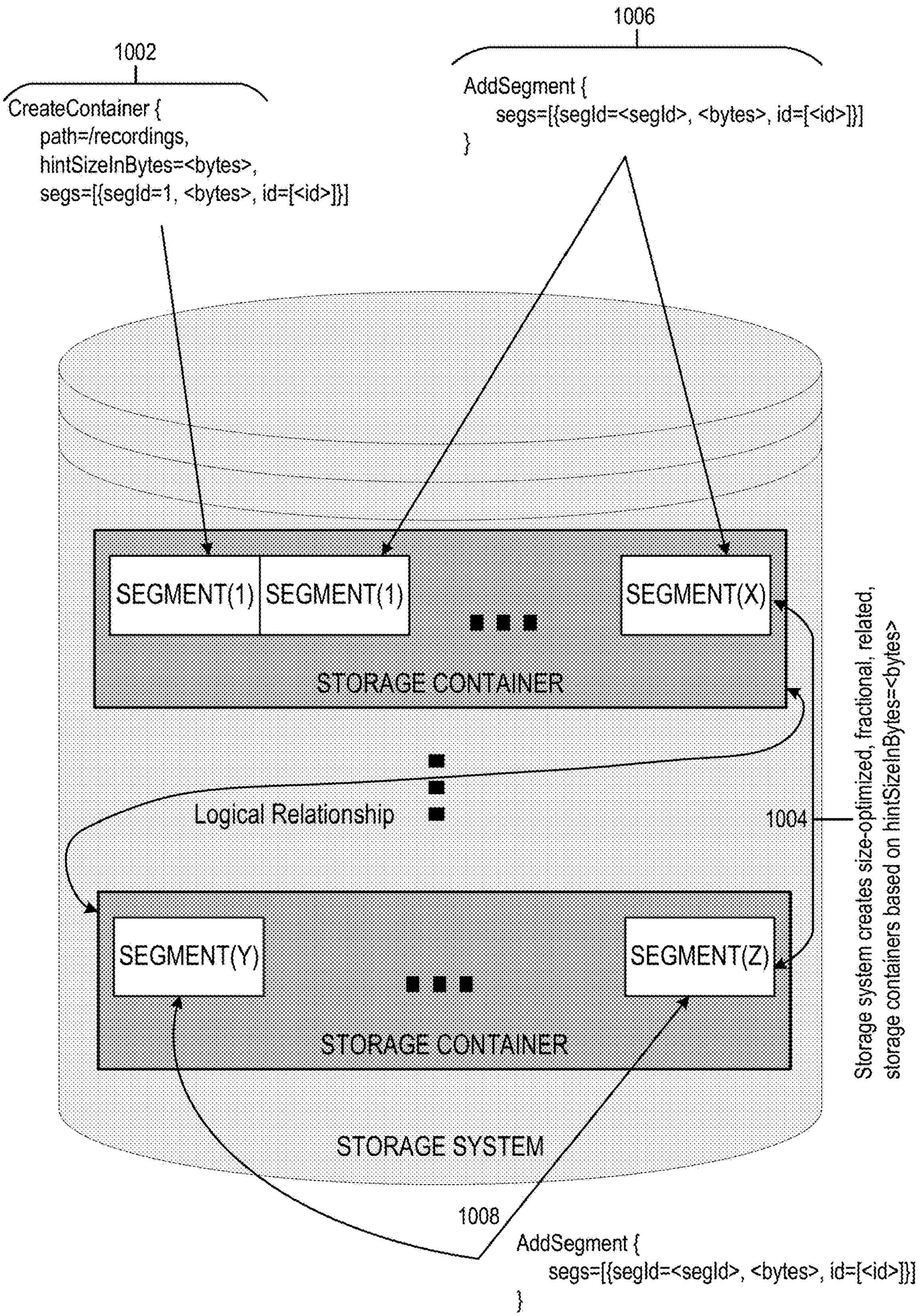
FIG. 10 shows a block diagram of an example storage device.

FIG. 10 shows a storage device 1000 of a storage system. The storage device 1000 of the storage system may include multiple storage containers. Each storage container may include multiple content segments. The storage system may split a CreateContainer request into multiple, related storage containers at the storage device 1000. At step 1002, a storage gateway may generate a CreateContainer request that is divided among a plurality of logically associated or related storage containers at the storage device 1000. The CreateContainer request may include a hintSizeInBytes parameter that specifies an allocated storage which is logically associated with the plurality of storage containers at the storage device 1000 and/or the content segment(s) identified by the CreateContainer request. For example, at step 1004, the storage gateway may split the CreateContainer request so that four logically related containers each having 5 MB of storage capacity are created at the storage device 1000 for a 20 MB hintSizeInBytes parameter. In this way, the hintSizeInBytes parameter may be used to determine a best fit for underlying subsystems, such as a file system, physical media, and/or the like. In other words, the storage device 1000 may create size-optimized, fractional, and logically related storage containers based on the amount of anticipated storage capacity according to the hintSizeInBytes parameter.

Subsequent AddSegment requests handled by the storage system may be placed into these optimized, related storage containers at the storage device 1000. At step 1006, the storage gateway may address a first subsequent AddSegment request by adding identified content segment(s) into one or more of the related storage containers at the storage device 1000 based on an estimated storage size of the identified segment(s) and/or allocated storage capacity (e.g., based on the hintSizeInBytes parameter). For example, the storage gateway may store segment (2) and segment (x) into a first storage container of the related storage containers at the storage device 1000. At step 1008, the storage gateway may process a first subsequent AddSegment request by adding identified content segment(s) into one or more of the related storage containers at the storage device 1000 based on estimated storage size and/or allocated storage capacity. For example, the storage gateway may store segment (y) and segment (z) into a second storage container of the related storage containers at the storage device 1000.

Figure 11:
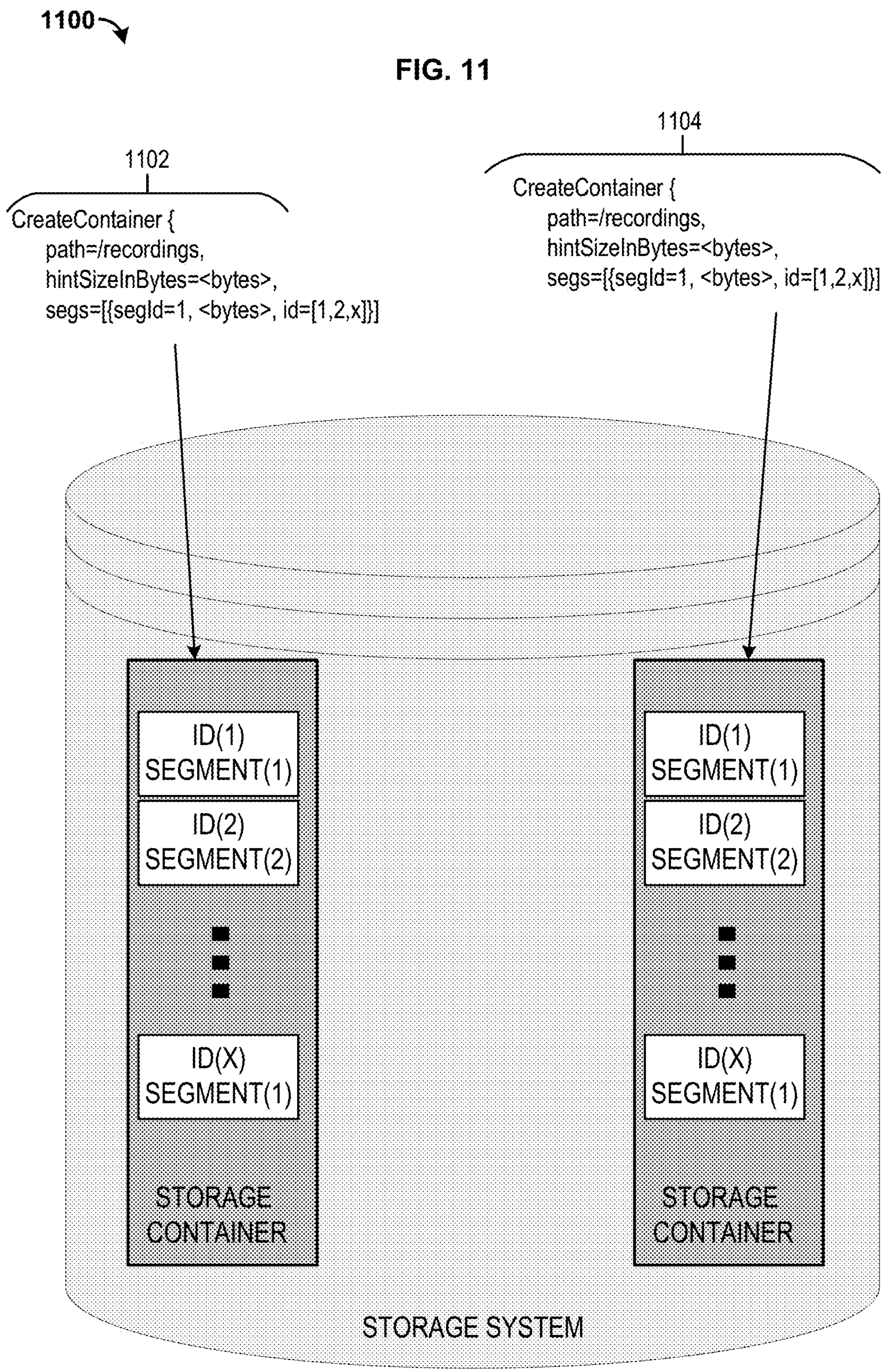
FIG. 11 shows a block diagram of an example storage device.

FIG. 11 shows an example storage device 1100 of a storage system. The storage device 1100 may include storage containers. Each storage container at the storage device 1100 may include multiple content segments. For subsystem sequential write optimizations, all unique segments identified in a given initial add content segment request may be sequentially written into a storage container having a minimum storage capacity size dictated by a hintSizeInBytes parameter. In this way, the content segments that are requested to be stored at the storage device 1100 may be stored in the storage container based on estimated storage size. The estimated storage size may be based on the hintSizeInBytes parameter.

At step 1102, a storage gateway may generate a CreateContainer request to create a new storage container at the storage device 1100 having storage allocated for the unique content segments identified in the initial request. Each content segment may be associated with a unique identifier, such as identifier (1), identifier (2) . . . identifier (x). Subsequent AddSegment request for the same unique identifiers may be sent to a storage gateway so that all unique segments within a single request are sequentially stored into a previously written container at the storage device 1100.

For example, all instances of a segment (1) may be stored in the same storage container at the storage device 1100. Similarly, all instances of a segment (x) may be stored in the same storage container at the storage device 1100. At step 1104, the storage gateway may sequentially store instances of a particular segment into the same storage container at the storage device 1100 instead of using a storage container per each unique identifier at the storage device 1100. Accordingly, the storage device 1100 may implement fanout write operations based on CreateContainer and AddSegment requests.

Figure 12:
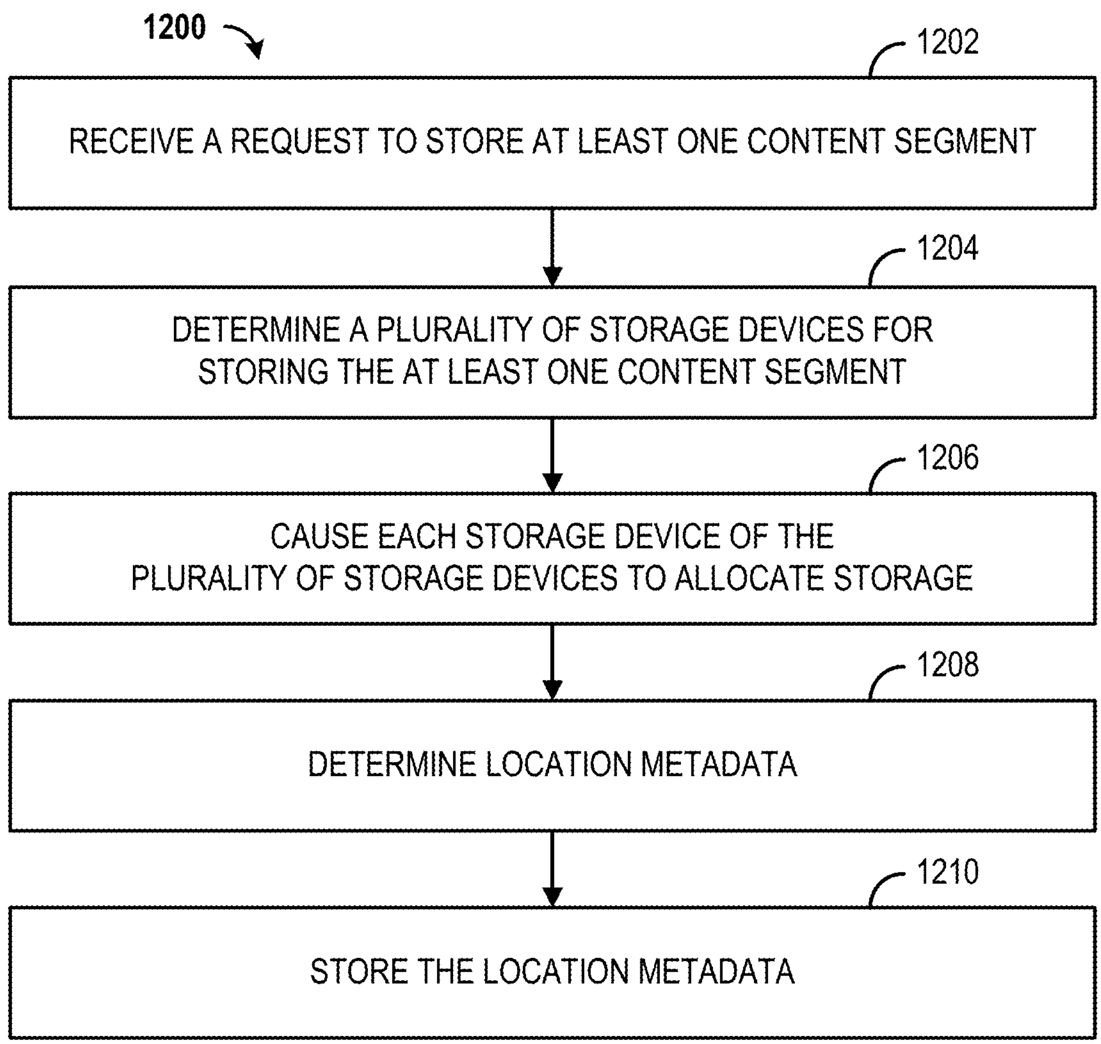
FIG. 12 shows a flowchart of an example method.

FIG. 12 shows a flowchart illustrating an example method 1200 for storage management. The method 1200 may be implemented using the devices shown in FIGS. 1-11. For example, the method 1200 may be implemented using the storage gateway 420. At step 1202, a first computing device may receive a request to store at least one content segment. The request may comprise an estimated storage size associated with the at least one content segment. The estimated storage size may be based on a hintSizeInBytes parameter. The at least one content segment may be associated with a unique identifier. At step 1204, a storage system may determine a plurality of storage devices for storing the at least one content segment. For example, the plurality of storage devices may be determined based on the estimated storage size. At step 1206, the storage system may cause each storage device of the plurality of storage devices to allocate storage for the at least one content segment. At step 1208, the storage system may determine location metadata indicative of the allocated storage for the at least one content segment at each storage device of the plurality of storage devices. The location metadata may be associated with the unique identifier. At step 1210, the storage system may store the location metadata at one or more of a cache of the first computing device or a metadata repository.

The request to store the at least one content segment may be received from a second computing device associated with an application tier. For example, the first computing device may also receive a request to store at least one further content segment associated with the at least one content segment. The storage system may also determine, based on the estimated storage size, that the allocated storage for the at least one content segment at a first storage device of the plurality of storage devices is not sufficient for storing the at least one further content segment. The storage system may also cause the first storage device to allocate further storage for the at least one further content segment. For example, the allocated further storage for the at least one further content segment may be logically associated with the allocated storage for the at least one content segment. The first computing device may also receive request to store the at least one content segment. The storage system may retrieve location metadata from a cache of the first computing device and the location metadata is indicative of the allocated storage for the at least one content segment at each storage device of the plurality of storage devices. The storage system may cause based on the location metadata, each storage device of the plurality of storage devices to store the at least one content segment with the unique identifier. The storage system may store the location metadata at the metadata repository. The first computing device may receive a request for the at least one content segment. The storage system may determine based on the location metadata indicative of the allocated storage for the at least one content segment, a first storage device of the plurality of storage devices. The storage system may cause the first storage device to send the at least one content segment to an origin server.

Figure 13:
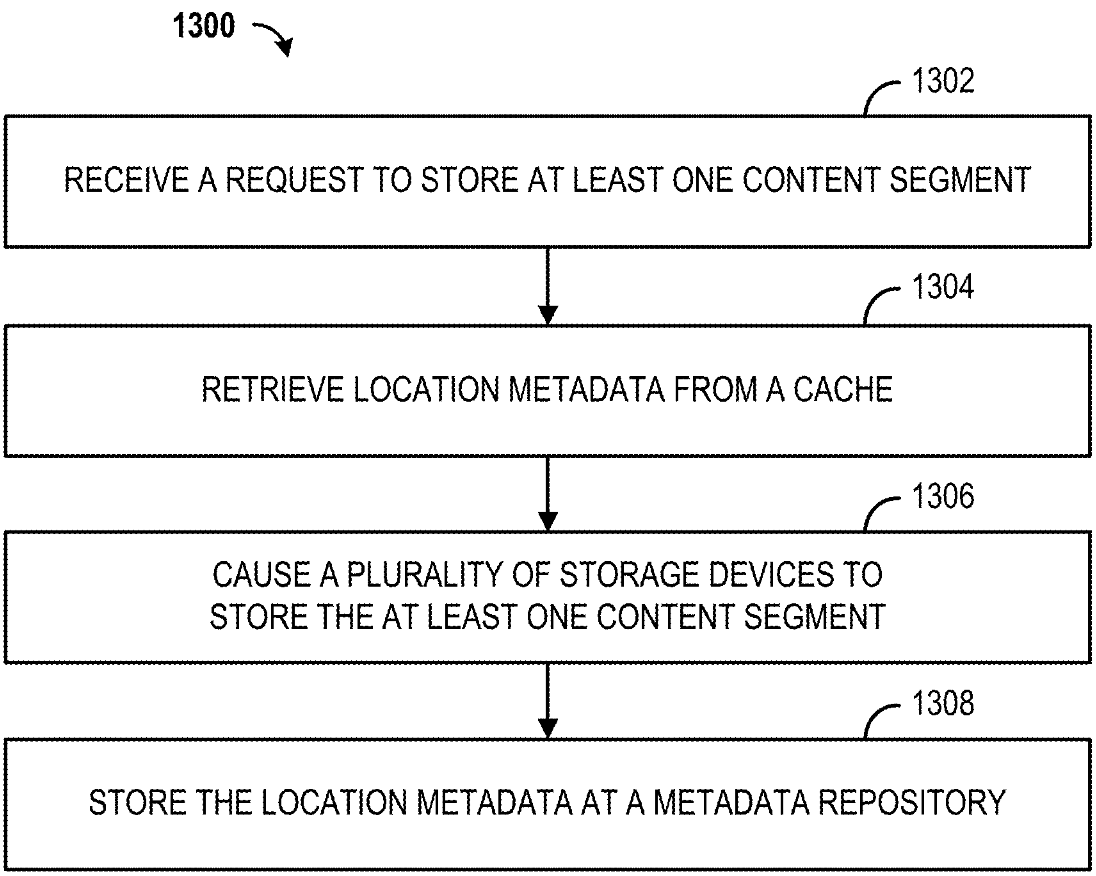
FIG. 13 shows a flowchart of an example method.

FIG. 13 shows a flowchart illustrating an example method 1300 for storage management. The method 1300 may be implemented using the devices shown in FIGS. 1-11. For example, the method 1300 may be implemented using the storage gateway 420. At step 1302, a first computing device may receive a request to store at least one content segment. At step 1304, a storage system may retrieve, based on a unique identifier associated with the at least one content segment, location metadata from a cache of the first computing device. The location metadata may be indicative of allocated storage for the at least one content segment at each storage device of a plurality of storage devices. At step 1306, the storage system may cause, based on the location metadata, each storage device of the plurality of storage devices to store the at least one content segment with the unique identifier. At step 1308, the storage system may store the location metadata at a metadata repository. For example, the location metadata may be retrieved from the metadata repository.

The request may be received from a second computing device associated with an application tier. The at least one content segment may be stored at each storage device of the plurality of storage devices contiguously with at least one further content segment associated with the at least one content segment. The storage system may determine, based on an estimated storage size associated with the at least one content segment, the plurality of storage devices for storing the at least one content segment. The storage system may cause each storage device of the plurality of storage devices to allocate storage for the at least one content segment. The storage system may store the location metadata at the cache of the first computing device. The first computing device may receive a request to store at least one further content segment associated with the at least one content segment. The storage system may determine, based on the estimated storage size, that the allocated storage for the at least one content segment at a first storage device of the plurality of storage devices is not sufficient for storing the at least one further content segment. The storage system may cause the first storage device to allocate further storage for the at least one further content segment. The allocated further storage for the at least one further content segment may be logically associated with the allocated storage for the at least one content segment. The first computing device may receive a request for the at least one content segment. The storage system may determine, based on the location metadata indicative of the allocated storage for the at least one content segment, a first storage device of the plurality of storage devices. The storage system may cause the first storage device to send the at least one content segment to an origin server.

Figure 14:
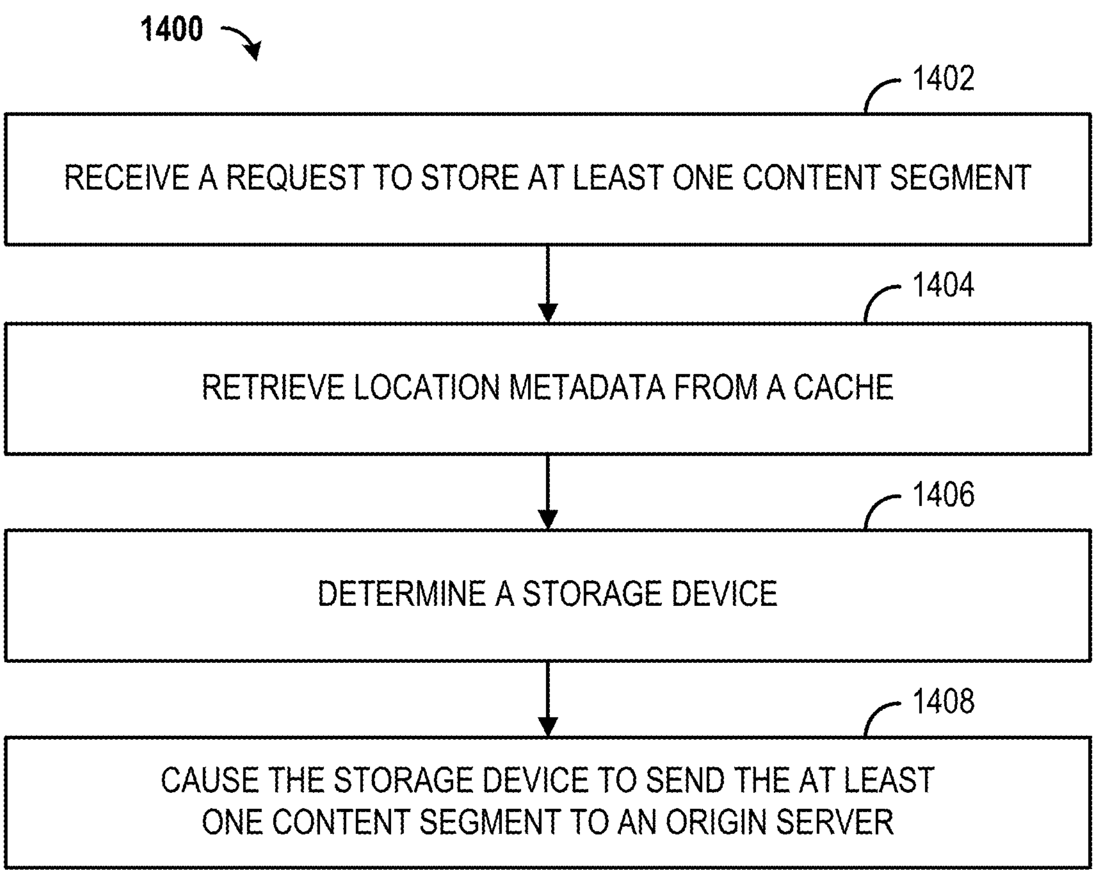
FIG. 14 shows a flowchart of an example method.

FIG. 14 shows a flowchart illustrating an example method 1400 for storage management. The method 1400 may be implemented using the devices shown in FIGS. 1-11. For example, the method 1400 may be implemented using the storage gateway 420. At step 1402, a first computing device may receive a request to store at least one content segment. At step 1404, a storage system may retrieve, based on a unique identifier associated with the at least one content segment, location metadata from a cache of the first computing device. The location metadata may be indicative of allocated storage for the at least one content segment at each storage device of a plurality of storage devices. At step 1406, the storage system may determine, based on the location metadata indicative of the allocated storage for the at least one content segment, a first storage device of the plurality of storage devices. At step 1408, the storage system may cause the first storage device to send the at least one content segment to an origin server. For example, the location metadata may be retrieved from the metadata repository. The at least one content segment may be stored at each storage device of the plurality of storage devices contiguously with at least one further content segment associated with the at least one content segment.

The first computing device may receive a request to store the at least one content segment. The storage system may retrieve the location metadata from the cache of the first computing device. The storage system may cause, based on the location metadata, each storage device of the plurality of storage devices to store the at least one content segment with the unique identifier. The storage system may store the location metadata at the metadata repository. The storage system may determine, based on an estimated storage size associated with the at least one content segment, the plurality of storage devices for storing the at least one content segment. The storage system may cause each storage device of the plurality of storage devices to allocate storage for the at least one content segment. The storage system may store the location metadata at the cache of the first computing device. The first computing device may receive a request to store at least one further content segment associated with the at least one content segment. The storage system may determine, based on the estimated storage size, that the allocated storage for the at least one content segment at a first storage device of the plurality of storage devices is not sufficient for storing the at least one further content segment. The storage system may cause the first storage device to allocate further storage for the at least one further content segment. For example, the allocated further storage for the at least one further content segment may be logically associated with the allocated storage for the at least one content segment.

Figure 15:
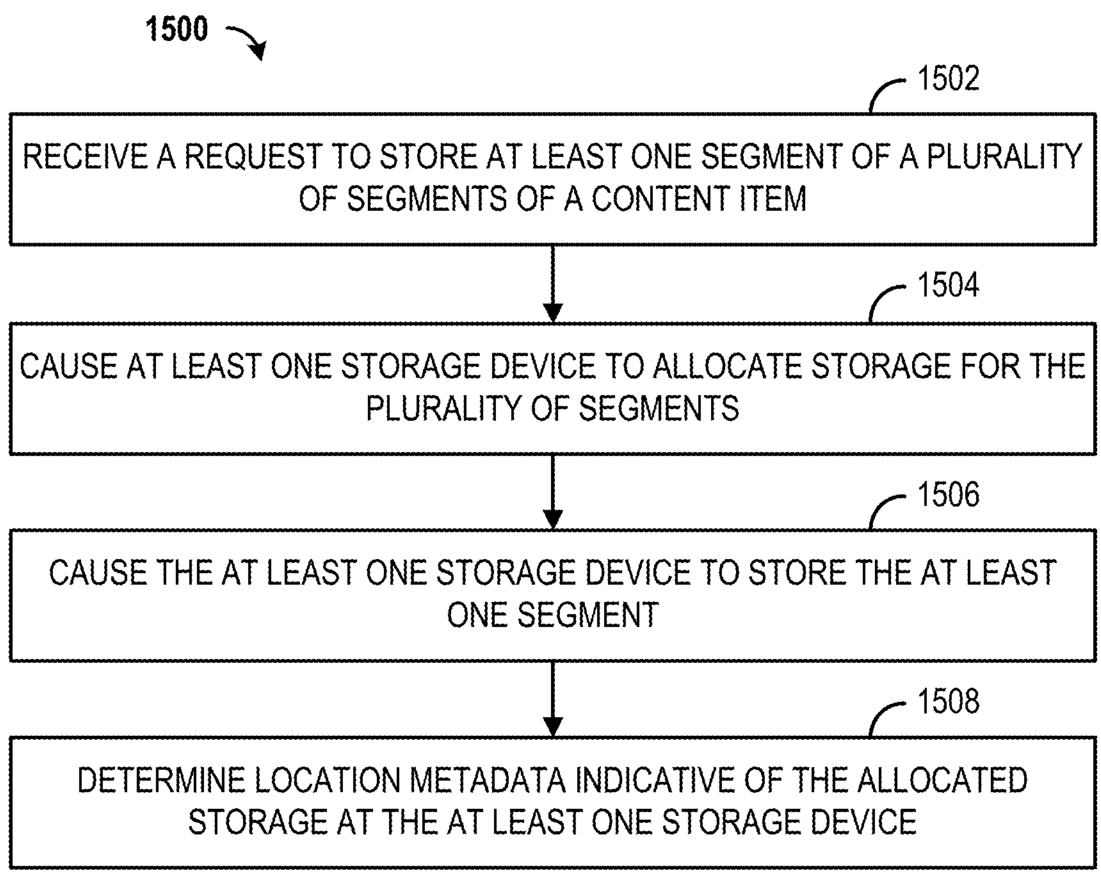
FIG. 15 shows a flowchart of an example method.

FIG. 15 shows a flowchart of an example method 1500 for storage management. The method 1500 may be implemented using the devices shown in FIGS. 1-11. For example, the method 1500 may be implemented using the storage gateway 420.

At step 1502, a request to store at least one segment may be received. A computing device, for example, a storage gateway device, a storage subsystem management device, a storage tier device, and/or the like, may receive a request to store at least one segment of a plurality of segments of a content item. The request may comprise an estimated storage size associated with the plurality of segments. The estimated storage size may be, for example, based on a hintSizeInBytes parameter. The at least one segment may be associated with a unique identifier.

Receiving the request to store the at least one content segment may include, for example, receiving the request from another computing device, such as a segment recorder, a content packaging device, and/or the like associated with an application tier.

At step 1504, at least one storage device of a plurality of storage devices may allocate storage for the plurality of content segments. For example, the computing device may cause the at least one storage device to allocate storage for the plurality of content segments. For example, a storage system and/or the computing device may determine storage devices with capacity to store content of at least the estimated storage size. The storage system and/or the computing device may determine storage devices of the plurality of storage devices with the capacity to store content of at least the estimated storage size based on periodic communications (e.g, status polling, telemetry data, etc.) between the storage system and/or the computing device and the plurality of storage devices.

The allocated storage may include a plurality of data containers. The plurality of storage devices may allocate storage as a single data container and/or a plurality of data containers that are logically associated/referenced. Allocating storage estimated to be sufficient for an entire content item, or a portion thereof, prior to a request to store the entire content item enables segments of the content item to be stored contiguously, for example, within a storage subsystem (e.g., the plurality of storage devices, etc.). For example, causing the at least one storage device to store the at least one content segment may include causing the at least one storage device to store the at least one segment in a first data container of the plurality of data containers. The method 1200 may further include causing, based on a request to store at least one additional segment of the plurality of segments, the at least one storage device to store the at least one additional segment in a second data container of the plurality of data containers. The first data container may include and/or be associated with a reference, such as a logical reference, to the second data container.

At 1506, the at least one storage device of the plurality of storage devices may store the at least one segment of the content item in the allocated storage. For example, the computing device may causing the at least one storage device to store the at least one segment in the allocated storage. The at least one segment of the content item may be sent to the the at least one storage device and the at least one storage device may store the the at least one segment in the allocated storage.

At step 1508, location metadata indicative of allocated storage for the at least one segment at the at least one storage device and/or each storage device of the plurality of storage devices may be determined. For example, the storage system and/or the computing device may determine location metadata indicative of the allocated storage for the at least one segment at the at least one storage device and/or each storage device of the plurality of storage devices. The location metadata may be associated with the unique identifier.

The location metadata may be stored at one or more of a cache, such as a cache of and/or associated with the computing device, or a metadata repository. For example, the storage system and/or the computing device may store the location metadata at one or more of a cache of the computing device or a metadata repository. The request to store the at least one segment may be received from from another computing device, such as a segment recorder, a content packaging device, and/or the like associated with an application tier.

The method 1500 may further include retrieving, based on a request for at least one segment of the content item, the location metadata from at least one of a cache of the first computing device or a metadata repository. Based on the location metadata, the at least one storage device may be determined. The at least one storage device may send (be caused to send) the at least one segment to another computing device.

The method 1500 may further include receiving a request to store at least one segment of another plurality of segments of the content item. The another plurality of segments may correspond to and/or match the plurality of segments. The storage system and/or the computing device may cause the at least one storage device to store the at least one segment of the another plurality of segments in the allocated storage.

Figure 16:
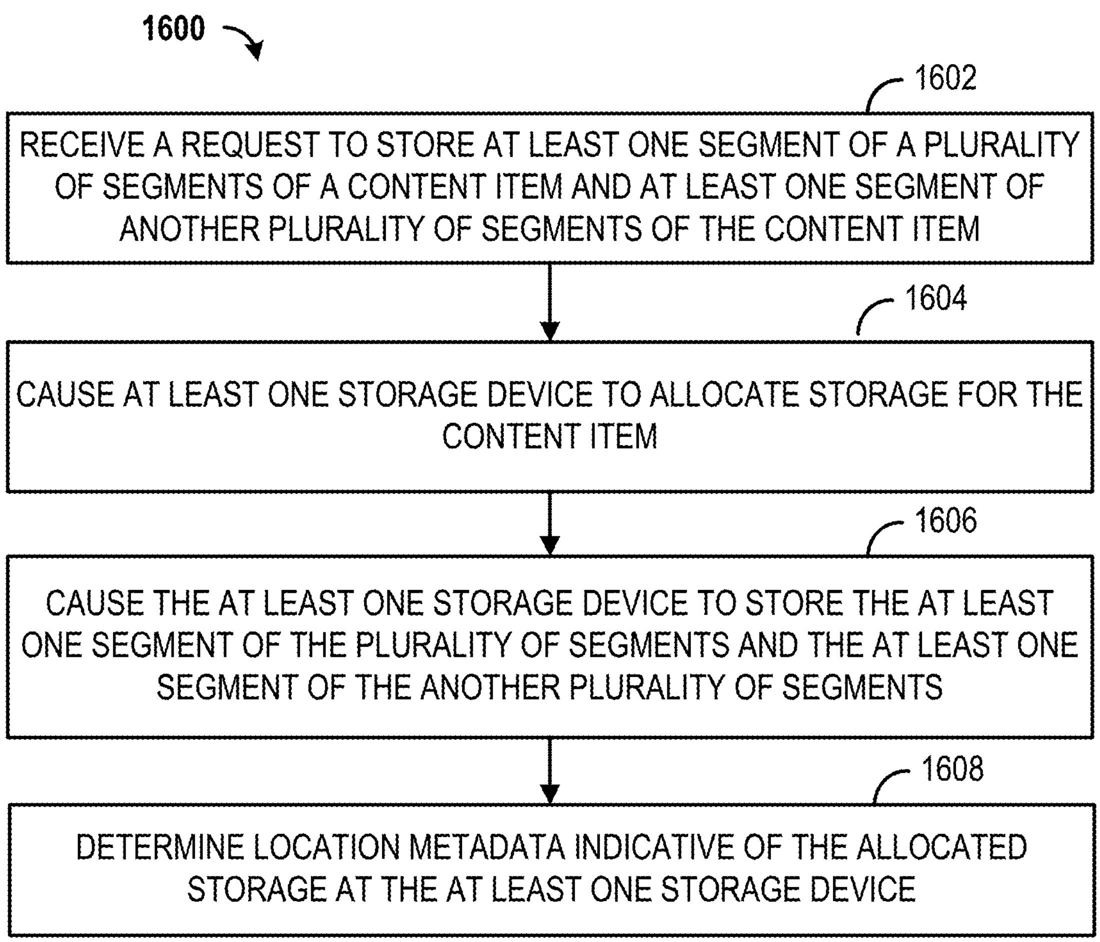
FIG. 16 shows a flowchart of an example method.

FIG. 16 shows a flowchart of an example method 1600 for storage management. The method 1600 may be implemented using the devices shown in FIGS. 1-11. For example, the method 1600 may be implemented using the storage gateway 420.

At step 1602, a request to store at least one segment of a content item and at least one segment of another plurality of segments of the content item may be received. A computing device, for example, a storage gateway device, a storage subsystem management device, a storage tier device, and/or the like, may receive a request to store at least one segment of a plurality of segments of a content item and at least one segment of another plurality of segments of the content item. For example, the request may be based on two different users executing a DVR same command to store a movie, a show, a program, and/or the like. For example, the another plurality of segments of the content item may correspond to the plurality of segments of the content item because the are the same/matching segments of the content item being requested to be stored. Receiving the request to store content item segments may include, for example, receiving the request from another computing device, such as a segment recorder, a content packaging device, and/or the like associated with an application tier.

The request may comprise an estimated storage size associated with the content item (e.g., the plurality of segments, the another plurality of segments, etc.). The estimated storage size may be, for example, based on a hintSizeInBytes parameter. The at least one segment of the plurality of segments of the content item and the at least one segment of the another plurality of segments of the content item may each be associated with a unique identifier.

At step 1604, at least one storage device of a plurality of storage devices may allocate storage for the content item (e.g., the plurality of segments, the another plurality of segments, etc.). For example, the computing device may cause the at least one storage device to allocate storage for the content item (e.g., the plurality of segments, the another plurality of segments, etc.). For example, a storage system and/or the computing device may determine storage devices with capacity to store content of at least the estimated storage size associated with the content item (e.g., the plurality of segments, the another plurality of segments, etc.). The storage system and/or the computing device may determine storage devices of the plurality of storage devices with the capacity to store content of at least the estimated storage size based on periodic communications (e.g, status polling, telemetry data, etc.) between the storage system and/or the computing device and the plurality of storage devices.

The allocated storage may include a plurality of data containers. The plurality of storage devices may allocate storage as a single data container and/or a plurality of data containers that are logically associated/referenced. Allocating storage estimated to be sufficient for an entire content item, or a portion thereof, prior to a request to store the entire content item enables segments of the content item to be stored contiguously, for example, within a storage subsystem (e.g., the plurality of storage devices, etc.). For example, causing the at least one storage device to store the at least one content segment of the plurality of segments of the content item and the at least one segment of the another plurality of segments of the content item may include causing the at least one storage device to store the at least one content segment of the plurality of segments of the content item and the at least one segment of the another plurality of segments of the content item in a first data container of the plurality of data containers. The method 1600 may further include causing, based on a request to store at least one additional segment of the plurality of segments of the content item and/or at least one additional segment of the another plurality of segments of the content item, the at least one storage device to store the at least one additional segment of the plurality of segments and/or the at least one additional segment of the another plurality of segments in a second data container of the plurality of data containers. The first data container may include and/or be associated with a reference, such as a logical reference, to the second data container.

At 1606, the at least one storage device of the plurality of storage devices may store the at least one content segment of the plurality of segments of the content item and the at least one segment of the another plurality of segments of the content item in the allocated storage. For example, the computing device may cause the at least one storage device to store the at least one content segment of the plurality of segments of the content item and/or the at least one segment of the another plurality of segments of the content item in the allocated storage. The at least one content segment of the plurality of segments of the content item and/or the at least one segment of the another plurality of segments of the content item may be sent to the at least one storage device the at least one storage device may store the at least one content segment of the plurality of segments of the content item and/or the at least one segment of the another plurality of segments of the content item in the allocated storage.

At step 1608, location metadata indicative of allocated storage for the at least one segment at the at least one storage device and/or each storage device of the plurality of storage devices may be determined. For example, the storage system and/or the computing device may determine location metadata indicative of the allocated storage for the at least one segment at the at least one storage device and/or each storage device of the plurality of storage devices. The location metadata may be associated with the identifiers for the at least one content segment of the plurality of segments of the content item and the at least one segment of the another plurality of segments of the content item.

The location metadata may be stored at one or more of a cache, such as a cache of and/or associated with the computing device, or a metadata repository. For example, the storage system and/or the computing device may store the location metadata at one or more of a cache of the computing device or a metadata repository. Request to store content item segments may be received from from another computing device, such as a segment recorder, a content packaging device, and/or the like associated with an application tier.

The method 1600 may further include retrieving, based on a request for at least one segment of the content item, the location metadata from at least one of a cache of the first computing device or a metadata repository. Based on the location metadata, the at least one storage device may be determined. The at least one storage device may send (be caused to send) the at least one content segment of the plurality of segments of the content item and/or the at least one segment of the another plurality of segments of the content item to another computing device.

Figure 17:
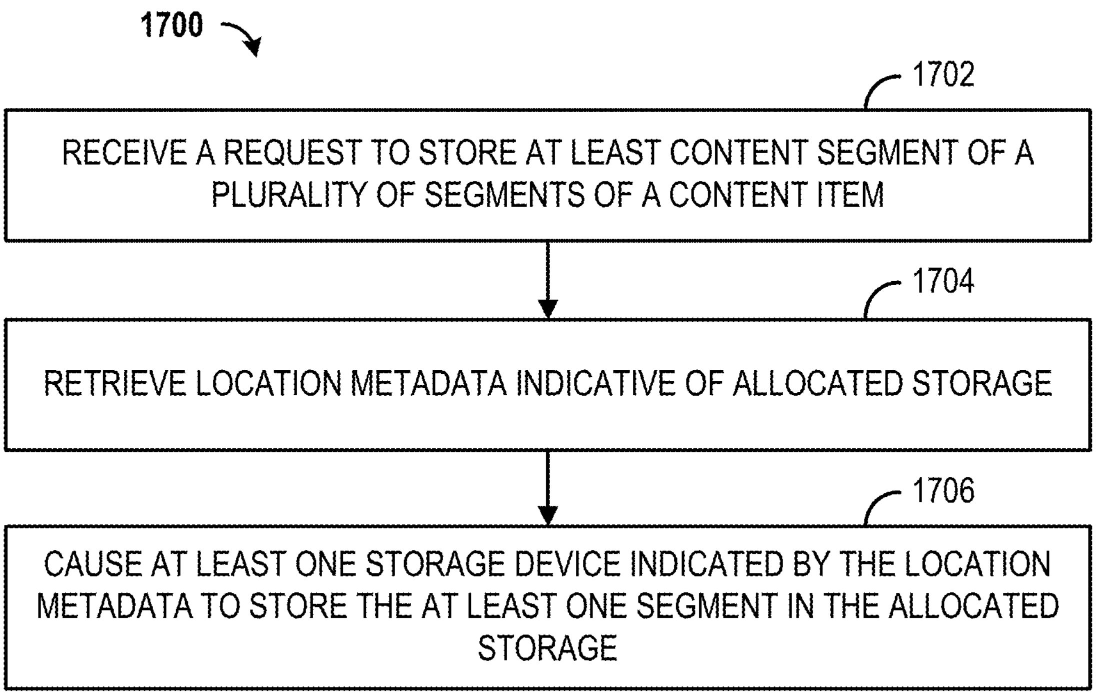
FIG. 17 shows a flowchart of an example method.

FIG. 17 shows a flowchart of an example method 1700 for storage management. The method 1700 may be implemented using the devices shown in FIGS. 1-11. For example, the method 1700 may be implemented using the storage gateway 420.

At step 1702, a request to store at least one segment of a plurality of segments of a content item may be received. A computing device, for example, a storage gateway device, a storage subsystem management device, a storage tier device, and/or the like may receive a request to store at least one segment of a plurality of segments of a content item. The request may be received, for example, from another computing device, such as a segment recorder, a content packaging device, and/or the like associated with an application tier.

The method 1700 may further include determining, based on an estimated storage size associated with the plurality of segments, the plurality of storage devices. At least two storage devices of the plurality of storage devices may allocate (and/or be caused to allocate) the allocated storage. The at least two storage devices may store the at least one segment in the allocated storage.

At step 1704, location metadata may be retrieved. For example, the computing device may retrieve, based on an identifier associated with the plurality of segments, location metadata. The location metadata may be indicative of allocated storage for the plurality of segments at least one storage device of a plurality of storage devices. Retrieving the location metadata comprises retrieving the location metadata from at least one of a cache of the computing device or a metadata repository.

At step 1706, the at least one storage device may store the at least one segment in the allocated storage. For example, the computing device may cause, based on the location metadata, the at least one storage device to store the at least one segment in the allocated storage. The method 1700 may further include, for example, updating, based on causing the at least one storage device to store the at least one segment in the allocated storage, the location metadata. The updated location metadata may include an identifier associated with the at least one segment of the content item.

The method 1700 may further include determining, based on the estimated storage size and a request to store at least one additional segment of the plurality of segments, that the allocated storage is at capacity. Based on determining that the allocated storage is at capacity, the at least one storage device may be caused to allocate additional storage. The allocated storage may include and/or be associated with a reference, such as a logical reference, to the allocated additional storage.

The method 1700 may further include causing the at least one storage device to store the at least one additional segment in the allocated additional storage. For example, the computing device may cause the at least one storage device to store the at least one additional segment in the allocated additional storage.

The method 1700 may further include receiving a request for the at least one segment. The at least one storage device may be determined based on the location metadata indicative of the allocated storage for the at least one segment. The at least one storage device may send the at least one segment to another computing device.

Figure 18:
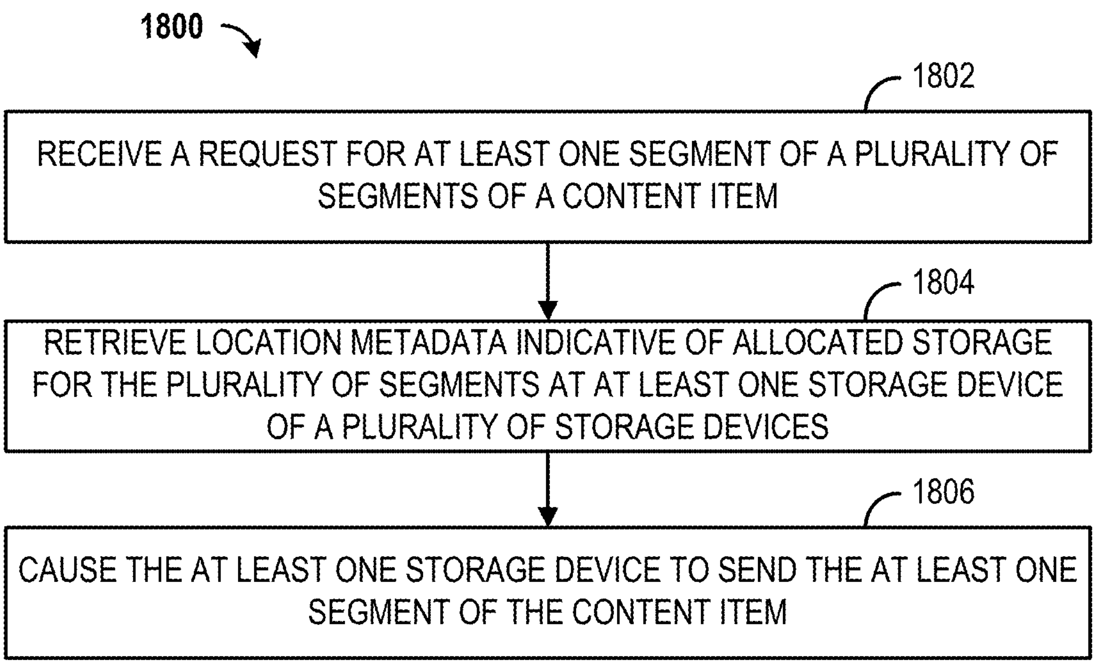
FIG. 18 shows a flowchart of an example method.

FIG. 18 shows a flowchart of an example method 1800 for storage management. The method 1800 may be implemented using the devices shown in FIGS. 1-11. For example, the method 1800 may be implemented using the storage gateway 420.

At step 1802, a request for at least one segment of a plurality of segments of a content item may be received. A first computing device, for example, a storage gateway device, a storage subsystem management device, a storage tier device, and/or the like, may receive a request for at least one segment of a plurality of segments of a content item. The request may be received from and/or associated with, for example, a second computing device, such as an origin server, a client device, an edge device, a user device, a content output device, and/or the like. For example, the request may be based on a request for a stored movie, show, program, and/or the like.

The method 1800 may further include receiving a request to store the at least one segment of the plurality of segments and at least one segment of another plurality of segments of the content item. For example, the first computing device may receive the request. The request may include an estimated storage size associated with the content item. The first computing device may cause, based on the estimated storage size, the at least one storage device to allocate the allocated storage. The first computing device may cause the at least one storage device to store the at least one segment of the plurality of segments and the at least one segment of the another plurality of segments in the allocated storage.

At step 1804, location metadata may be retrieved. The first computing device may retrieve, based on an identifier associated with the at least one segment of the content item, location metadata. The location metadata may be indicative of allocated storage for the plurality of segments at least one storage device of a plurality of storage devices. Retrieving the location metadata may include retrieving the location metadata from at least one of a cache of the first computing device or a metadata repository.

At 1806, the the at least one segment of the content item may be sent. The first computing device may cause, based on the location metadata, the at least one storage device to send the at least one segment to the second computing device.

The method 1800 may further include determining, based on an estimated storage size associated with the plurality of segments, the plurality of storage devices. At least two storage devices of the plurality of storage devices may allocate and/or be caused to allocate the allocated storage. The at least two storage devices may store the at least one segment in the allocated storage.

Figure 19:
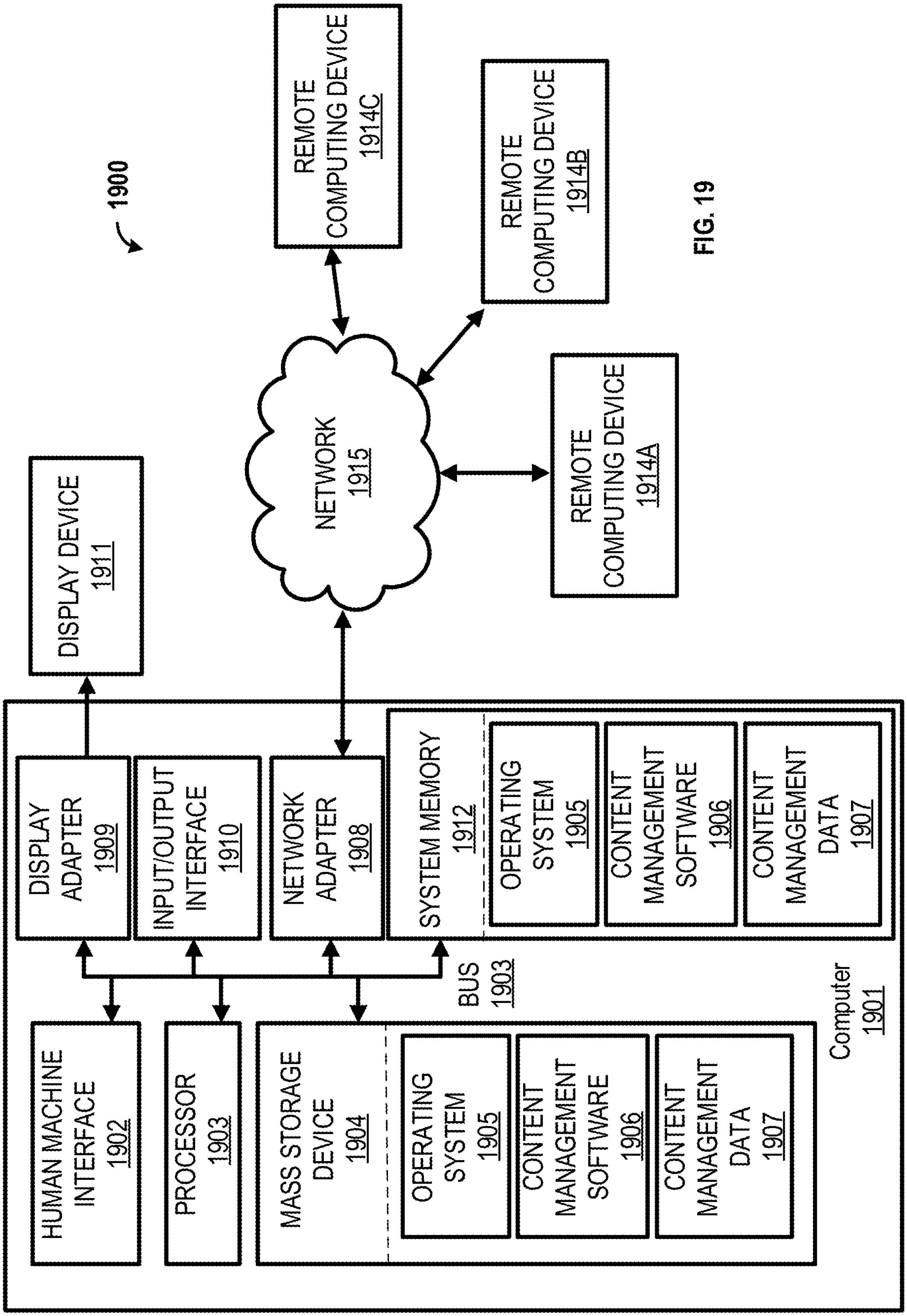
FIG. 19 shows a block diagram of an example computing device.

The methods and systems may be implemented on a computer 1901 and/or any device/component described herein may be a computer 1901 as shown in FIG. 19 and described below. Similarly, the methods and systems disclosed may utilize one or more computers to perform one or more functions in one or more locations. FIG. 19 shows a block diagram of an example operating environment 1900 for performing any method described herein. This example operating environment 1900 is only an example of an operating environment and is not intended to suggest any limitation as to the scope of use or functionality of operating environment architecture. Neither should the operating environment 1900 be interpreted as having any dependency or requirement relating to any one or combination of components shown in the example operating environment 1900.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods may also be practiced in grid-based and distributed computing environments where tasks are performed by remote processing devices that are linked through a communications network. In a distributed computing environment, program modules may be located in local and/or remote computer storage media including memory storage devices.

Further, one skilled in the art will appreciate that the systems and methods disclosed herein may be implemented via a general-purpose computing device in the form of a computer 1901. The computer 1901 may comprise one or more components, such as one or more processors 1903, a system memory 1912, and a bus 1913 that couples various components of the computer 1901 including the one or more processors 1903 to the system memory 1912. In the case of multiple processors 1903, the system may utilize parallel computing.

The bus 1913 may comprise one or more of several possible types of bus structures, such as a memory bus, memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1913, and all buses specified in this description may also be implemented over a wired or wireless network connection and one or more of the components of the computer 1901, such as the one or more processors 1903, a mass storage device 1904, an operating system 1905, content management software 1906, content management data 1907, a network adapter 1908, system memory 1912, an Input/Output Interface 1910, a display adapter 1909, a display device 1911, and a human-machine interface 1902, may be contained within one or more remote computing devices 1914*a,b,c* at physically separate locations, connected through buses of this form, in effect implementing a fully distributed system.

The computer 1901 typically comprises a variety of computer-readable media. Example readable media may be any available media that is accessible by the computer 1901 and comprises, for example, and not meant to be limiting, both volatile and non-volatile media, removable and non-removable media. The system memory 1912 may comprise computer-readable media in the form of volatile memory, such as random access memory (RAM), and/or non-volatile memory, such as read-only memory (ROM). The system memory 1912 typically may comprise data such as content management data 1907 and/or program modules such as operating system 1905 and content management software 1906 that are accessible to and/or are operated on by the one or more processors 1903.

The computer 1901 may, for example, also comprise other removable/non-removable, volatile/non-volatile computer storage media. The mass storage device 1904 may provide non-volatile storage of computer code, computer-readable instructions, data structures, program modules, and other data for the computer 1901. For example, a mass storage device 1904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Optionally, any number of program modules may be stored on the mass storage device 1904, including by way of example, an operating system 1905 and content management software 1906. One or more of the operating system 1905 and content management software 1906 (or some combination thereof) may comprise elements of the programming and the content management software 1906. Content management data 1907 may also be stored on the mass storage device 1904. Content management data 1907 may be stored in any of one or more databases known in the art. Examples of such databases comprise, DB2®, Microsoft® Access, Microsoft® SQL Server, Oracle®, MySQL, PostgreSQL, and the like. The databases may be centralized or distributed across multiple locations within the network 1915.

The user may enter commands and information into the computer 1901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 1903 via a human-machine interface 1902 that is coupled to the bus 1913, but may be connected by other interface and bus structures, such as a parallel port, game port, an IEEE 1394 Port (also known as a Firewire port), a serial port, network adapter 1908, and/or a universal serial bus (USB).

A display device 1911 may also be connected to the bus 1913 via an interface, such as a display adapter 1909. It is contemplated that the computer 1901 may have more than one display adapter 1909 and the computer 1901 may have more than one display device 1911. For example, a display device 1911 may be a monitor, an LCD (Liquid Crystal Display), light-emitting diode (LED) display, television, smart lens, smart glass, and/or a projector. In addition to the display device 1911, other output peripheral devices may comprise components such as speakers (not shown) and a printer (not shown) which may be connected to the computer 1901 via Input/Output Interface 1910. Any step and/or result of the methods may be output in any form to an output device. Such output may be any form of visual representation, including, but not limited to, textual, graphical, animation, audio, tactile, and the like. The display 1911 and computer 1901 may be part of one device, or separate devices.

The computer 1901 may operate in a networked environment using logical connections to one or more remote computing devices 1914*a,b,c*. By way of example, a remote computing device 1914*a,b,c* may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 1901 and a remote computing device 1914*a,b,c* may be made via a network 1915, such as a local area network (LAN) and/or a general wide area network (WAN). Such network connections may be through a network adapter 1908. A network adapter 1908 may be implemented in both wired and wireless environments. Such networking environments are conventional and commonplace in dwellings, offices, enterprise-wide computer networks, intranets, and the Internet.

For purposes of example, application programs and other executable program components such as the operating system 1905 are shown herein as discrete blocks, although it is recognized that such programs and components may reside at various times in different storage components of the computing device 1901, and are executed by the one or more processors 1903 of the computer 1901. An implementation of content management software 1906 may be stored on or transmitted across some form of computer-readable media. Any of the disclosed methods may be performed by computer readable instructions embodied on computer-readable media. Computer-readable media may be any available media that may be accessed by a computer. By way of example and not meant to be limiting, computer-readable media may comprise "computer storage media" and "communications media." "Computer storage media" may comprise volatile and non-volatile, removable and non-removable media implemented in any methods or technology for storage of information such as computer-readable instructions, data structures, program modules, or other data. An example of computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

While the methods and systems have been described in connection with specific examples, it is not intended that the scope be limited to the particular example set forth, as the examples herein are intended in all respects to be examples rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of examples described in the specification.

It will be apparent to those skilled in the art that various modifications and variations may be made without departing from the scope or spirit. Other examples will be apparent to those skilled in the art from consideration of the specification and practice described herein. It is intended that the specification and examples be considered as examples only, with a true scope and spirit being indicated by the following claims.

The invention claimed is:

1. A method comprising:

receiving, by a computing device, a request to store a segment of a plurality of segments of a content item, wherein a storage device allocated storage for the plurality of segments;

causing, based on the allocated storage and an estimated storage size associated with the segment, the storage device to allocate further storage for the segment;

causing the storage device to store the segment in the allocated further storage; and determining location metadata indicative of the allocated further storage at the storage device.

2. The method of claim 1, wherein the segment is associated with an identifier, wherein the location metadata is further indicative of the identifier.

3. The method of claim 1, wherein receiving the request to store the segment comprises receiving the request from a second computing device associated with an application tier.

4. The method of claim 1, wherein the allocated further storage comprises a plurality of data containers, wherein causing the storage device to store the segment comprises causing the storage device to store the segment in a first data container of the plurality of data containers.

5. The method of claim 4, further comprising causing, based on a request to store a second segment of the plurality of segments, the storage device to store the second segment in a second data container of the plurality of data containers, wherein the first data container comprises a reference to the second data container.

6. The method of claim 1, further comprising:

retrieving, based on a request to retrieve the segment, the location metadata from at least one of a cache of the computing device or a metadata repository;

determining, based on the location metadata, the storage device; and causing the storage device to send the segment to a second computing device.

7. The method of claim 1, further comprising determining, based on an estimated storage size associated with the plurality of segments, a plurality of storage devices.

8. The method of claim 1, further comprising:

receiving a request to store a segment of a second plurality of segments of the content item, wherein the second plurality of segments correspond to the plurality of segments; and causing the storage device to store the segment of the second plurality of segments in the allocated further storage.

9. A method comprising:

receiving, by a computing device, a request to store a segment of a plurality of segments of a content item;

retrieving, based on an identifier associated with the plurality of segments, location metadata, wherein the location metadata is indicative of allocated storage for the plurality of segments in a storage device;

causing, based on the location metadata and an estimated storage size associated with the segment, the storage device to allocate further storage for the segment; and causing the storage device to store the segment in the allocated further storage.

10. The method of claim 9, further comprising updating, based on causing the storage device to store the segment in the allocated further storage, the location metadata, wherein the updated location metadata comprises an identifier indicative of the segment.

11. The method of claim 9, wherein retrieving the location metadata comprises retrieving the location metadata from at least one of a cache of the computing device or a metadata repository.

12. The method of claim 9, wherein receiving the request to store the segment comprises receiving the request from a second computing device, wherein the second computing device is associated with an application tier.

13. The method of claim 9, further comprising:

determining, based on an estimated storage size associated with the plurality of segments, a plurality of storage devices;

causing at least two storage devices of the plurality of storage devices to allocate the allocated further storage; and causing the at least two storage devices to store the segment in the allocated further storage.

14. The method of claim 13, further comprising:

determining, based on the estimated storage size associated with the plurality of segments and a request to store a second segment of the plurality of segments, that the allocated further storage is at capacity; and causing, based on determining that the allocated further storage is at capacity, the storage device to allocate additional storage, wherein the allocated further storage comprises a reference to the allocated additional storage.

15. The method of claim 14, further comprising causing the storage device to store the second segment in the allocated additional storage.

16. The method of claim 9, further comprising:

receiving a request for the segment;

determining, based on location metadata indicative of the allocated further storage for the segment, the storage device; and causing the storage device to send the segment to a second computing device.

17. A method comprising:

receiving, by a computing device, a request for a segment of a plurality of segments of a content item;

retrieving, based on an identifier associated with the segment, location metadata, wherein the location metadata is indicative of allocated storage comprising first allocated storage and second allocated storage for the plurality of segments in a storage device; and causing, based on the first allocated storage and an estimated storage associated with the segment, the storage device to store the segment in the second allocated storage.

18. The method of claim 17, wherein retrieving the location metadata comprises retrieving the location metadata from at least one of a cache of the computing device or a metadata repository.

19. The method of claim 17, further comprising:

determining, based on an estimated storage size associated with the plurality of segments, a plurality of storage devices;

causing at least two storage devices of the plurality of storage devices to allocate the second allocated storage; and causing the at least two storage devices to store the segment in the second allocated storage.

20. The method of claim 17, further comprising:

receiving a request to store the segment of the plurality of segments and a segment of a second plurality of segments of the content item, wherein the request comprises an estimated storage size associated with the content item;

causing, based on the estimated storage size associated with the content item, the storage device to allocate the second allocated storage; and causing the storage device to store the segment of the plurality of segments and the segment of the second plurality of segments in the second allocated storage.

* * * * *